United States Patent
Jeide et al.

(10) Patent No.: US 8,023,934 B2
(45) Date of Patent: Sep. 20, 2011

(54) SYNCHRONIZING COMMUNICATIONS AND DATA BETWEEN MOBILE DEVICES AND SERVERS

(75) Inventors: Scott A. Jeide, Meridian, ID (US); Senthil Krishnapillai, Eagle, ID (US); Brett Donahue, Eagle, ID (US)

(73) Assignee: iAnywhere Solutions, Inc., Dublin, CA (US)

( * ) Notice: Subject to any disclaimer, the term of this patent is extended or adjusted under 35 U.S.C. 154(b) by 744 days.

(21) Appl. No.: 12/104,905

(22) Filed: Apr. 17, 2008

(65) Prior Publication Data

US 2009/0247134 A1 Oct. 1, 2009

Related U.S. Application Data

(60) Provisional application No. 61/040,393, filed on Mar. 28, 2008.

(51) Int. Cl.
*H04M 3/00* (2006.01)

(52) U.S. Cl. ............ 455/418; 455/412.1; 709/248; 370/350

(58) Field of Classification Search .......... 455/418, 455/419, 412.1; 709/248; 370/350
See application file for complete search history.

(56) References Cited

U.S. PATENT DOCUMENTS

| | | | |
|---|---|---|---|
| 6,457,062 B1 * | 9/2002 | Pivowar et al. ............ 709/248 |
| 6,553,037 B1 * | 4/2003 | Pivowar et al. ............ 370/463 |
| 7,359,920 B1 | 4/2008 | Rybicki et al. |
| 7,565,381 B2 | 7/2009 | Oswalt |
| 7,613,834 B1 | 11/2009 | Pallipuram et al. |
| 7,620,001 B2 | 11/2009 | Ganji |
| 7,672,853 B2 | 3/2010 | Gune et al. |
| 7,752,165 B2 | 7/2010 | Ireland et al. |
| 7,792,790 B2 | 9/2010 | Kim |
| 2003/0005161 A1 * | 1/2003 | Chen et al. ............ 709/248 |
| 2004/0266441 A1 * | 12/2004 | Sinha et al. ............ 455/445 |
| 2005/0085503 A1 * | 4/2005 | Tsukamoto et al. ......... 514/310 |
| 2005/0091156 A1 * | 4/2005 | Hailwood et al. ............ 705/40 |
| 2005/0227614 A1 * | 10/2005 | Hosking et al. ............ 455/3.06 |
| 2006/0245530 A1 * | 11/2006 | Pradhan et al. ............ 375/364 |
| 2009/0282125 A1 | 11/2009 | Jeide et al. |

* cited by examiner

*Primary Examiner* — Danh Le
(74) *Attorney, Agent, or Firm* — Sterne, Kessler, Goldstein & Fox P.L.L.C.

(57) ABSTRACT

A system, method, and computer program product for synchronizing communications, data, application workflow events, and business processes between a mobile device and a server are described herein. In an embodiment, the method operates by determining whether there is a data object to be synchronized between a source and a target, wherein the source and target are one of either a mobile device or a server. An indication is sent to the target when there is a data object to be synchronized from the source. The data object to be synchronized is saved in a cache on the source and it is determined whether the mobile device is connected to the server. The synchronization operation is queued for the target until it is determined that the mobile device is connected to the server, and results are returned to the source after the data object is synchronized on the target.

22 Claims, 11 Drawing Sheets

Function Call Types

600

Function Calling Sequence for a new data object on a server

Calling sequence for new data objects

SYNCHRONIZING COMMUNICATIONS AND DATA BETWEEN MOBILE DEVICES AND SERVERS

CROSS-REFERENCE TO RELATED APPLICATIONS

The present application claims the benefit of U.S. Provisional Appl. No. 61/040,393, filed Mar. 28, 2008, which is incorporated by reference herein in its entirety.

FIELD OF THE INVENTION

The present invention relates generally to mobile communications and, more particularly, to synchronizing email, data, applications, business processes, and calendar updates between mobile client devices and servers.

BACKGROUND OF THE INVENTION

Mobile devices are in common usage, many featuring powerful processors, larger and more colorful displays, and wireless networking capabilities. Despite these advances in mobile technology, mobile devices typically have greater limitations on memory capacity, data storage capacity, central processing unit (CPU) capacity, and networkability than workstation computers. Given the versatility of mobile devices, it is helpful to implement a means by which these mobile devices can interact with servers to synchronize data and deliver email communications in the context of potentially intermittent, unreliable, occasionally-connected, or temporarily-unavailable networking capabilities.

As wireless networks mature and evolve, mobile devices are moving from being occasionally-connected to having near-constant network connectivity. As a function of increasing wireless network coverage and bandwidth, applications running on mobile client devices increasingly rely upon data synchronization with back end servers such as email servers. Current techniques for synchronizing data and email for mobile devices often stage data to be synchronized outside of corporate and organizational networks and firewall servers, which creates a potential security risk.

Interaction using data sets exchanged between mobile devices and central servers often occurs in the context of exchanges of email, calendar appointments, application data, business process tasks, and information stored in databases. Mobile devices often retain a subset of some of email messages and data found in enterprise databases in a local data store or database for local access on the device while the device is not connected to a wireless network. Mobile devices also retain application data, application rendering components, application execution logic, and Input/Output (I/O) parameters needed to run applications and perform business processes. Given the resource limitations of mobile devices, it inefficient to store an up to date copy of enterprise applications or databases. As mobile devices run a variety of operating systems, software suites, and programming frameworks; data, application, business process, and email synchronization needs to be platform independent.

Some current data and communications synchronization methods are synchronous and require that the mobile device being synchronized stay online and connected to a network during the entire synchronization process in order to provide results and acknowledgment to a server. Current 'store and forward' and 'push-pull' mobile communications synchronization methods are often symmetrical whereby both the mobile client device and the email server access a copy of a database (or a subset of a database) that is staged in an intermediate, mutually accessible location. Due to the fact that mobile devices are typically remote from the back end servers they synchronize with, synchronization data must often be staged on a third system that mobile devices and the back end servers can readily access. To facilitate accessibility from roaming mobile devices, data to be synchronized is often staged outside of an organizational or corporate firewall, thus exposing proprietary and confidential data to security risks. In typical store and forward synchronization systems, data to be synchronized is sent from a 'source' device or system to an intermediate server or node where it is stored until it is subsequently forwarded to the 'target' destination system. In these store and forward systems, the intermediate server is accessed symmetrically by the source and destination systems. Store and forward and push-pull data synchronization techniques also necessitate large amounts of network traffic in order to stage data to be synchronized on an intermediate server before it is ultimately forwarded or pushed to its destination system.

Current mobile data and email synchronization techniques often result in longer data delivery times than is desired and typically require that a mobile device's General Packet Radio Service (GPRS) be on and transmitting during the entire duration of a synchronization session with a server. Most current synchronization methods require large amounts of CPU and memory resources on mobile devices in addition to requiring that mobile devices GPRS services are running during synchronization, the combination of which results in rapid consumption of mobile device battery resources.

Current email and data synchronization methods do not provide for email-driven business process mobilization and do not enable actionable-responses on servers that complete business processes and application workflow operations based upon operations performed on mobile devices. While current methods may perform synchronization of data updated by an application, they do not include a delivery mechanism for applications or business process events that deliver these items to mobile devices. Although current methods include mobile services that use e-mail for notifications and alerting, these services are limited to sending e-mail to mobile devices that request additional user input for business process completion. Current systems and methods use email solely as a delivery mechanism for business-process events and lack a way for users of mobile devices to provide actionable-responses needed in order to complete business processes.

Accordingly, what is desired is a means of offering quicker delivery of email, business process events, and application data to mobile devices that also reduces network traffic and increases mobile device battery life. What is further is desired are methods, systems, and computer program products for improving synchronization of data objects such as email messages, applications, database records, and calendar entries/events between mobile devices and servers without staging the data objects outside of an organization's firewall servers.

What is also desired is a means of efficiently, securely, and reliably synchronizing email, applications, calendar entries, and other data objects between a plurality of mobile devices and servers without having to stage updated data on an intermediate servers. What is further desired are methods, systems, and computer program products that synchronize data objects and communications between mobile devices and servers in an asynchronous and symmetrical manner without requiring mobile devices to be online during synchronization and without storing data objects to be synchronized on an intermediate server.

SUMMARY OF THE INVENTION

The invention includes methods, systems, and computer program products for synchronizing data objects such as email messages, applications, database records, and calendar application entries, between mobile client devices and servers. The invention also includes methods, systems, and computer program products that allow mobilization of business processes. The methods, systems, and computer program products operate asynchronously, which allows them to synchronize data objects and applications on mobile client devices that are occasionally or intermittently connected to servers they are synchronizing with. The methods, computer program products, and systems operate symmetrically in that either a mobile device or a back end server such as an email server or enterprise server can initiate the synchronization of a data object such as an email message, a web services request, a method call, or a calendar application appointment. The methods, systems, and computer program products initiate data object synchronization by invoking functions that reside on mobile devices and back end servers such as email servers and enterprise servers. The data object synchronization methods, systems, and computer program products also serve as a mechanism to deliver business-process events between mobile devices and enterprise servers. The methods, systems, and computer program products provide actionable-responses from mobile devices to enterprise servers in order to facilitate completion of business processes.

In accordance with an embodiment of the invention, the method synchronizes updated, inserted, and deleted data objects such as email messages and calendar entries between a mobile device and an email server by invoking a sequence of functions which route the data and result from a mobile device to an email server via a synchronization server. Similarly, the method also synchronizes new, updated, and deleted data objects between an email server and a mobile device by invoking the sequence of functions in reverse in order to route the data objects and results from a mobile device to an email server via a synchronization server.

The method further delivers data and code necessary to create and run applications dynamically on mobile devices. The method delivers applications to mobile devices, wherein the applications include rendering components, execution logic or executable code, and Input/Output (I/O) parameters. In an embodiment, the method delivers applications from enterprise servers to mobile client devices and 'synchronizes' applications by sending application data back to the enterprise servers after the applications are executed on mobile clients. In another embodiment, the method synchronizes applications by re-running an application on an enterprise server using input and output captured on mobile devices where the applications were previously run. The method includes back-end integration whereby applications are created dynamically via a toolkit that ties enterprise applications to standard interfaces. The method delivers applications as a business process of enterprise applications. In an embodiment, web services and data objects such as business process 'widgets' are delivered to an enterprise server in a form that executes on the server after delivery from a mobile device with the I/O parameters that were used and captured on the mobile device.

The invention also includes a computer program product comprising a computer usable medium having computer program logic recorded thereon for enabling a processor to synchronize new, updated, and deleted data objects between a mobile device and a server. The computer program logic operates asynchronously and symmetrically to synchronize data objects such as email, and calendar entries between a mobile device running a client sync agent and an email server running a server sync agent.

The invention additionally includes a system capable of synchronizing data objects such as email messages, applications, and calendar entries between a plurality of mobile devices and a plurality of servers. The system includes a listening module configured to determine whether there is a data object to synchronize from a source mobile device to a destination server, a flagging module configured to notify the destination server that there is a data object to be synchronized, a caching module configured to cache the data object to be synchronized on the destination server, a determining module configured to determine whether the source mobile device is online, a queuing module configured to queue data synchronization until the mobile device is online, and a synchronization module configured to synchronize the data object on the destination server and to return results to the source mobile device. In accordance with an embodiment, the system also synchronizes data objects from a source server such as an email or enterprise server to a destination mobile device through use of a listening module on the server configured to determine whether there is a data object to synchronize from the server to a destination mobile device, a flagging module configured to notify the destination mobile device that there is a data object to be synchronized, a caching module configured to cache the data object to be synchronized on the mobile device, a determining module configured to determine whether the source mobile device is online, a queuing module configured to queue data synchronization until the mobile device is online, and a synchronization module configured to synchronize the data object on the destination mobile device and to return results to the source server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
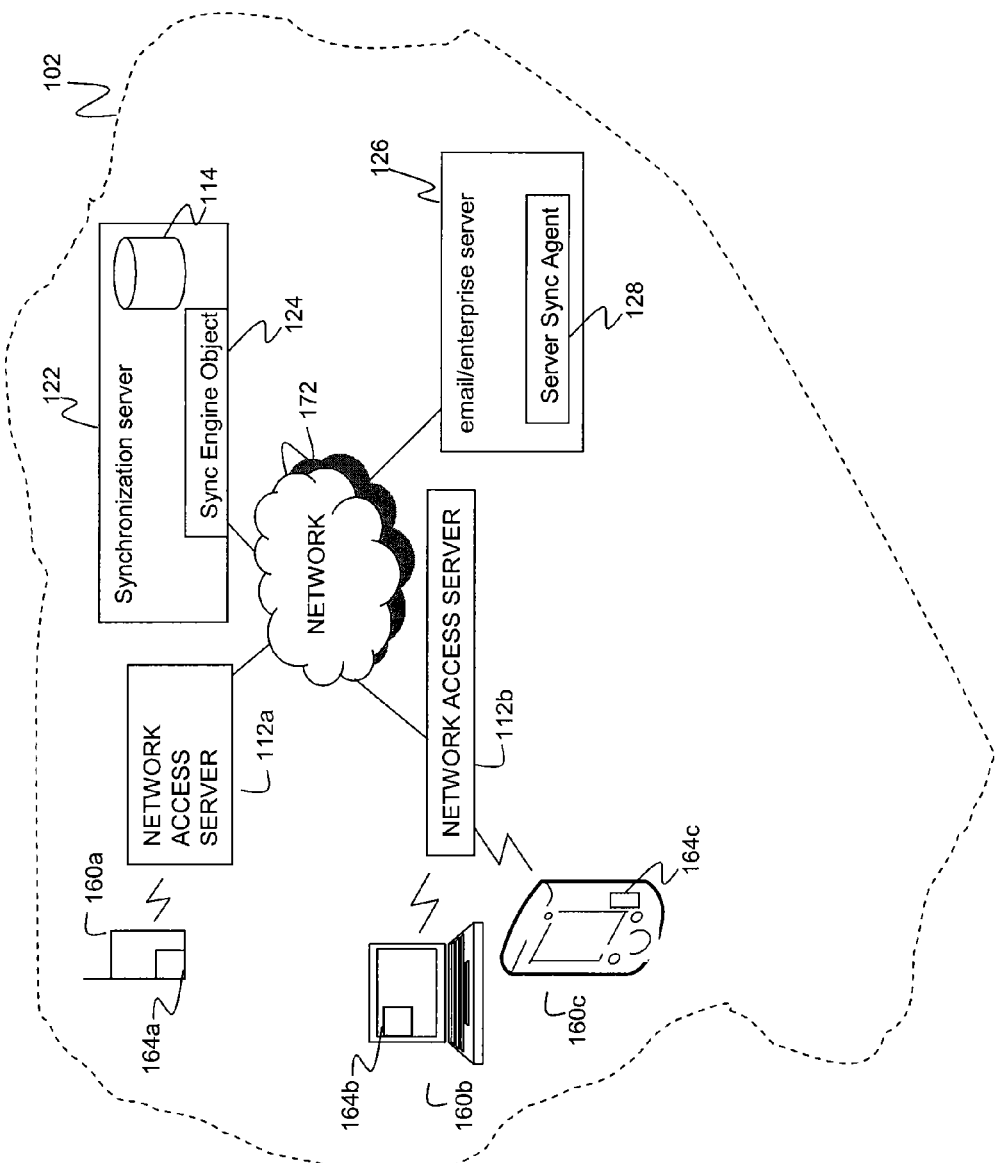
FIG. 1 depicts a mobile data environment, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The present invention relates to systems, methods, and computer program products for synchronizing data objects, applications, and business processes, between mobile client devices and back end servers such as email servers, application servers, and database servers.

A data object is any textual, audio, graphical, video, or written work encoded in digital form and encapsulated in a computer readable structure, such as a file, message, computer readable medium, or shared memory object; that a software application program can access and manipulate. Unless specifically stated differently, a data object is interchangeably used herein to identify an email message, application data, a calendar entry (such as an appointment in a calendar application), a web services request, a method call, a database record, a data store record, and/or communications data. A method call is an invocation of a subroutine or Java applet. A method such as a subroutine or applet can consist of a sequence of statements that perform an action, a set of input parameters used to tailor or customize the actions, and a return or output value. Methods provide a mechanism for accessing data by reading from and writing to the data. A method call may be modeled in terms of passing a message or request to an object. Instead of directly performing an operation on an object, a method call with corresponding input/output (I/O) parameters is sent to the object to instruct the object what operation it should perform. At this point, the object either performs the operation, or if the requested operation cannot be performed, the object raises an exception describing why the operation cannot be carried out. A web service is a software system designed to support interoperable interaction between servers and computers (including mobile devices) over a network. A web service may be a web application programming interface (API) that can be accessed over a network, such as a wireless network or the Internet, and executed on an enterprise server such as an application server or email server that hosts the requested web service(s).

An application is any software program or web service that can be executed or run on a server, computer, or mobile client device. An application includes at least a rendering component, execution logic, and Input/Output (I/O) parameters. An application's execution logic may be in the form of binary executable code or scripting programming/markup languages such as HyperText Markup Language (HTML), Extensible HTML (XHTML), Java, JavaScript, or AJAX (Asynchronous JavaScript and XML). One of skill in the relevant arts will appreciate that other programming languages and technologies can be used for an application's execution logic.

In accordance with an embodiment of the present invention, the data object synchronization methods and systems described herein serve as delivery mechanisms for applications and the workflow operations associated with the applications (i.e., application workflow events). Application workflows are comprised of related application operations. Application operations may be distributed amongst a plurality of servers and mobile devices, and therefore may not be performed sequentially. Application operations may include one or more of data entry, data deletion, data update, approval of requests, receipt confirmations, acknowledgment of alerts, and other events. An application workflow is typically composed of multiple related operations. These application operations may be encapsulated as 'application events.' Application events occur when application operations are completed or performed. In an embodiment, application workflows are mobilized and distributed between servers and mobile devices by synchronizing application events. For example, application event synchronization may be performed through email and data synchronization.

A business process is any collection of interrelated tasks which solve a particular problem or issue for an organization or enterprise. A business process may be a series of steps designed to produce a result. Business processes may result in an outputs or services that are received by users outside the organization. Other processes produce outputs that are not visible outside of the organization. Business processes can govern the operation of a system such as operational business processes that perform purchasing, manufacturing, marketing, and sales tasks in an organization. Supporting business processes such as accounting, benefits, information technology (IT), and human resources/recruiting, support an organization's core processes. A business process can be decomposed into several sub-processes, wherein the respective sub-processes have their own attributes, and wherein the sub-processes contribute to performing the overall task of the business process. Complex business processes link multiple organizations or enterprises through business process management and activity monitoring tools.

In accordance with an embodiment of the present invention, business processes are mobilized using the data object synchronization approach disclosed herein to enable business and application workflow events to be 'synchronized' between enterprise servers and mobile devices. For example users of mobile devices can perform actions to complete business processes, such as approval of expense reports, human resource requisitions and purchase orders, or notifications from Customer relationship management (CRM) activities.

According to an embodiment, a web services interface provides seamless server integration with mobile devices via use of business process widgets. Widgets are objects or applets on a computer display that a user interacts with. Business process widgets contain information about business process events as well as information that describes a user interface (UI) layout. Business process widgets may include Extensible Markup Language (XML) script or binary data that describes a business process event and a UI layout. For example, business process widgets may include Extensible Application Markup Language (XML) script or code. Business process widgets can be self contained or can interact with native applications resident on a mobile device or server and can invoke native applications. For example, a business process widget may include a Uniform Resource Locator (URL) link that launches a web browser on a mobile device such as Internet Explorer Mobile. For example, a widget may be a data object on a mobile device display screen that users of the mobile device interact with. Widget applets provide access to data and applications such as calendar applications. A widget may be a stand-alone, task-oriented application which can be composed of several related interactions or processes. A software system, such as a web browser, can run or execute widgets.

Business process widgets are abstractions of simple business processes or sub-processes. In an embodiment, business process widgets are customized to suit typical applications that can be deployed to mobile devices. Examples of business process and application widgets include purchase order approval, human resources approval processes, expense report approval process, sales and marketing processes, CRM activities notification, and Really Simple Syndication (RSS) format Internet feed notifications.

According to embodiments of the invention, data objects, applications, and business process widgets on mobile client devices are synchronized by calling or invoking symmetrical functions residing on servers and mobile devices. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The detailed description of embodiments of the present invention is divided into several sections. The first section describes a system for synchronizing data objects such as email messages, calendar updates, application data, and database records between mobile client devices and servers such as email servers and back end database servers. Subsequent sections describe systems and methods for mobilizing business processes and synchronizing application workflow events between enterprise application servers and mobile devices.

FIG. 1 depicts a mobile environment 100 which allows mobile devices 160a-c to synchronize email with email server 126 over the Internet 102, in accordance with an embodiment of the present invention. While this embodiment is described in terms of email, it is applicable to other data objects. One skilled in the relevant arts will appreciate that any network, such as a corporate intranet, may be used instead of the Internet 102. Server sync agent 128 on email server 126 synchronizes email delivery between mobile devices 160a-c and email server 126 via network 172. Mobile device 160a accesses network 172 via network access server 112a in order to send and receive email to and from email server 126. Mobile devices 160b and 160c access network 172 via network access server 112b in order to synchronize email with email server 126.

Mobile devices 160a-c may be one of many devices commonly designated as mobile clients, such as, but not limited to, personal digital assistants ("PDAs"), devices operating according to the Microsoft Pocket PC specification with the Microsoft Windows® CE operating system (OS), devices running the Symbian OS, devices running the Palm OS®, mobile phones, BlackBerry® devices, smart phones, hand held computers, palmtop computers, laptop computers, ultra-mobile PCs, and other wireless mobile devices capable of running mobile applications.

Sync engine object 124 also allows mobile devices 160a-c to receive the most current data available on synchronization server 122. Client sync agents 164a-c running on mobile devices 160a-c enable mobile devices 160a-c to upload their most current data to database 114 on synchronization server 122 for any given application or set of applications. For example, a calendar application might allow other users to add or make changes to appointments which are then stored on synchronization server 122. A user of mobile device 160a may also have added, deleted, or made changes to appointments within mobile device 160a itself.

Unless specifically stated differently, a user is interchangeably used herein to identify a human user, a software agent, or a group of users and/or software agents. Besides a human user who needs to synchronize email, data, and calendar entries, a software application or agent sometimes needs to synchronize these items. Accordingly, unless specifically stated, the term "user" as used herein does not necessarily pertain to a human being.

Upon synchronization, synchronization server 122 learns of the appointments made, changed, or deleted on mobile device 160a, and mobile device 160a learns of appointments made, changed, or deleted on server 122. In accordance with an additional embodiment of the present invention, a partial synchronization is possible, whereby some subset of appointments may be exchanged. According to an embodiment, the subset of appointments are determined based upon criteria including, but not limited to, available memory on a mobile device, user permissions or roles on a mobile device, available network bandwidth between email server 126 and a mobile device, central processing unit (CPU) speed on a mobile device, available storage space on a mobile device, and other factors. In an embodiment, the criteria or rules for determining which subset of appointments will be synchronized is stored in a data store or database accessible by synchronization server 122.

In accordance with an embodiment, data stored in database 114 hosted by server 122 may also be synchronized with local data stores or databases residing on client devices 160a-c. "Data" as used herein may be any object, including, but not limited to, information in any form (text, video, audio, etc.) and applications.

In another embodiment, applications can be synchronized between Enterprise Servers and mobile devices. Application synchronization is achieved via methods and systems similar to those described herein to synchronize data objects. The methods and systems that deliver applications from enterprise servers to mobile devices deliver application executables along with input/output parameters to the mobile devices. For example data and/or code necessary to create and run an application is dynamically delivered to mobile devices. For example, for some applications, only the data needed to run the applications is delivered to a mobile device. For other applications, application code and associated data needed to run the applications is delivered to a mobile device. An Application includes at least a rendering component, execution logic, and Input/Output (I/O) parameters. According to an embodiment of the present invention, applications are delivered from enterprise servers to mobile devices and after these applications are executed on mobile clients, the application is synchronized on enterprise servers by re-running or executing the application on enterprise servers with the I/O captured from mobile devices.

According to an embodiment of the present invention, application completion processes are delivered to mobile devices in a concise and capsular manner by encapsulating processes and workflow that needs to be executed by applications running on back end or enterprise server. For example, there is back-end integration whereby applications are created dynamically via a toolkit that ties enterprise applications to standard interfaces. Applications are delivered as a business process of the enterprise applications. Web services, widgets, and data objects are delivered in a form that runs on a server after delivery from mobile devices with the I/O parameters that were used on the mobile devices.

Mobile environment 100 is commonly a persistent network connection over a cellular provider network, and communications travel over the Internet 102. However, mobile environment 100 may be any communication means by which synchronization server 122, email server 126, and mobile devices 160*a-c* may interact, such as a docking cradle, Wide Area Network (WAN), Local Area Network (LAN), Wireless Local Area Network (WLAN), infrared, or Bluetooth. The degree of availability of access to the communication means employed may vary greatly, and users of mobile devices 160*a-c* may go for days without synchronizing with server 122 or email server 126, or may be able to synchronize constantly when connected to a WAN.

In a typical mobile environment such as mobile environment 100, multiple mobile devices 160*a-c* synchronize with email server 126 via synchronization server 122. Synchronization server 122 and email server 126 need not be a single physical computer, and may in fact comprise several computers distributed over a number of physical and network locations. For the purposes of illustration, synchronization server 122 and email server 126 are depicted as single points of access in mobile environment 100. Synchronization server 122 and email server 126 need not be separate physical computers either, and may in fact comprise a single computer as the functionality of synchronization server 122 may be performed by a virtual machine running on email server 126. Conversely, the functionality of email server 126 may be performed by a virtual machine executing on synchronization server 122.

II. Synchronization Systems

Figure 2:
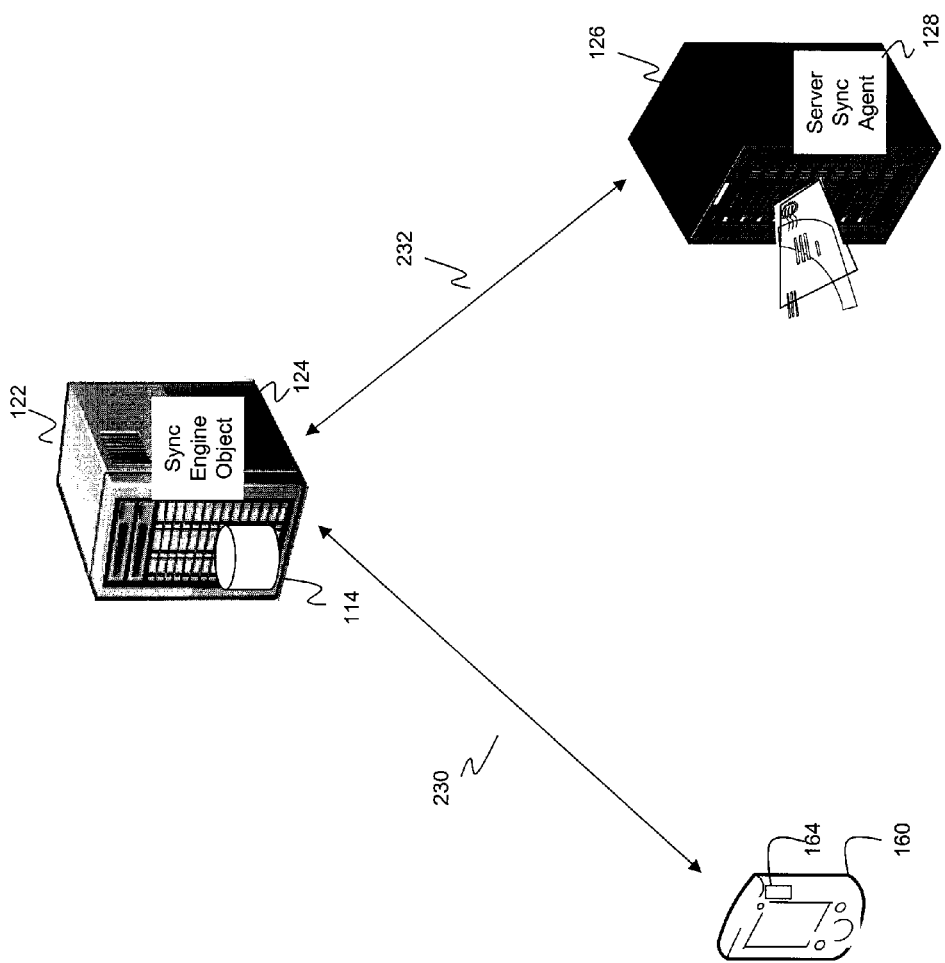
FIG. 2 illustrates a modular view of a synchronization system, in accordance with an embodiment of the present invention.

FIG. 2 depicts synchronization system 200 in which mobile device 160 is capable of synchronizing with synchronization server 122 via interface 230. In accordance with an embodiment of the present invention, interface 230 facilitates calls between sync engine object 124 running on server 122 and client sync agent 164 running on mobile device 160. In an embodiment, interface 230 is comprised of functions that are called to pass data and variables between mobile device 160 and synchronization server 122. In an embodiment, synchronization system 200 is operable to synchronize a database 114 located at synchronization server 122 with a local data store or database located at mobile device 160. In another embodiment, database 114 is remote to synchronization server 122.

Synchronization system 200 is also operable to synchronize email between email server 126 and synchronization server 122 via interface 232. According to an embodiment of the invention, interface 232 facilitates function calls between sync engine object 124 hosted on server 122 and server sync agent 128 running on email server 126. In an embodiment, interface 232 is comprised of functions that are called to pass email messages and associated data between email server 126 and synchronization server 122. Email is then synchronized on mobile device 160 by passing email messages and data from synchronization server 122 via interface 230.

When a user composes a new email message on mobile device 160, client sync agent 164 running on mobile device 160 is operable to deliver the new email message and associated data to sync engine object 124 on synchronization server 122 via interface 230. After the new email message is received at synchronization server 122, it is delivered to server sync agent 128 on email server 126 via interface 232.

Figure 3:
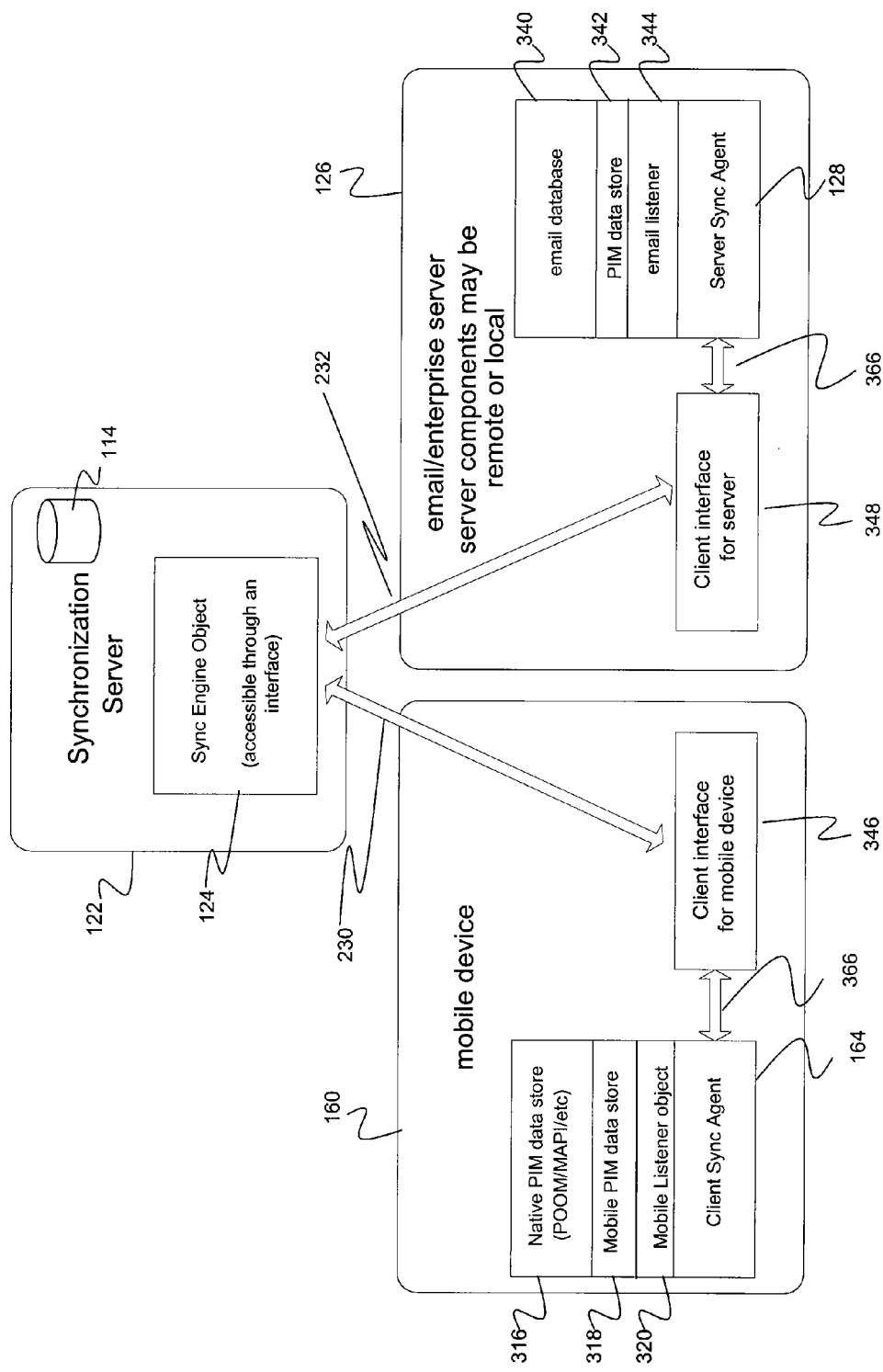
FIG. 3 illustrates synchronization engines, synchronization agents, listeners, and data stores, in accordance with an embodiment of the present invention.

FIG. 3 depicts the components of synchronization system 300, according to an embodiment. Synchronization system 300 includes sync engine object 124, the sync agents, the data stores, and listeners used to synchronize email between mobile device 160, synchronization server 122, and email server 126, in accordance with an embodiment of the present invention. In the synchronization process performed by synchronization system 300, three mobile 'objects' handle the synchronization of email and data between mobile client 160, synchronization sever 122, and email server 126. The main server side object is sync engine object 124. Sync engine object 124 works in coordination with client sync agent 164, which is an object running on mobile device 160. Client sync agent proxies 366 represent the proxy objects used to reach client sync agent 164 on mobile device 160 and server sync agent 128 on email server 126. Asynchronous function calls between the sync engine object 124, client sync agent 164, and server sync agent 128 are handled by the respective client sync agent proxies 366 on mobile device 160 and email server 126.

Sync engine object 124 calls server sync agent 128, which handles the actual back-end server-side personal information manager (PIM) provider. In accordance with an embodiment of the invention, the PIM provider may be one of many applications commonly designated enterprise email applications, such as, but not limited to, Microsoft Exchange, Lotus Domino, and Novell GroupWise.

According to an embodiment, synchronization system 300 is operable to synchronize portions of database 114 located on synchronization server 122 with a local data store or database located at mobile device 160. In another embodiment, database 114 is remote to synchronization server 122.

In an embodiment, the data store on mobile device 160 is native PIM data store 316. For example, native PIM data store 316 may be a Pocket Outlook Object Model (POOM) data store, a Messaging Application Programming Interface (MAPI) data store, or another data store native to a specific application running on mobile device 160. Mobile PIM data store 318 is used to store results of local operations on mobile device 160. Mobile listener object 320 detects data changes (including, but not limited to data updates, deletes, and insertions) on mobile device 160.

In an embodiment, server sync agent 128 is a local object resident on email server 126 that uses a local email PIM data store 342 to read and write data to native databases such as local email database 340, and server sync agent 128 is notified of changes by a local email listener 344 resident on email server 126. In another embodiment, components such as one or more of server sync agent 128, email database 340, PIM data store 342, and email listener 344 are remote to email server 126. When server 128 is notified of a change in local email database 340, it uses email PIM data store 342 to read the actual data object change, and then email listener 344 notifies server sync agent 128 of the change. From there, server sync agent 128 relays the change to client sync agent 164 that is participating in the synchronization via sync engine object 124 on synchronization server 122.

Server sync agent 128 and client sync agent 164 work in conjunction with each other to implement interface 232 that sync engine object 124, can use to insert, update, and/or delete email, data, and calendar records. In accordance with an embodiment of the invention, data is passed along interface 232 by function calls between a local interface in sync engine object 124 on synchronization server 122 and client interface 348 on email server 126. In an embodiment, the functional components of interface 232 are depicted as pseudo-code below:

```
// Updates the given data object in the given data store
virtual void UpdateRecord(
    int iDeviceId,              // (in) the device ID for the update (needed
on server agents, but not necessary for clients)
    eSyncData storeType DsType,  // (in) the data store to update
    CmoBinary& Id,               // (in/out) the record ID to update
    CmoBinary& RecordData,       // (in) the wbxml representation of the
                                 // XMLRecord
    tSyncRecordVer& Version,     // (in/out) The previous Version of
                                 // the data object. If the current value
does
                                 // not match the given value, then the Update
                                 // call must return a SYNC_ERR_CONFLICT
                                 // exception. On successful update, the
                                 // new Version value should be returned.
) = 0;
// Adds a new data object to a data store
virtual void NewRecord( TempId,    ///(in) A temporary record ID
assigned by the caller to identify the data object
        LastMod,        ///(in/out) A unique value that identifies the
                        /// current 'revision' of the data object
                        /// Could be a lastMod date/time, change counter,
                        /// or checksum. Needs to be
                        /// a value that is modified every time the
                        /// data object is modified.
        RecordId        /// (out) The actual record ID used for
                        /// the data object after the data object has been inserted.
                );
// Deletes a data object from a data store
virtual void DeleteRecord(
    int iDeviceId,              // (in) the device ID for the update (needed
on server agents, but not necessary for clients)
    eSyncData storeType DsType,  // (in) the data store to delete from
    CmoBinary& Id,               // (in) the record ID to delete
    tSyncRecordVer& Version,     // (in) The previous Version of
                                 // the data object. If the current value does
                                 // not match the given value, then the DeleteRecord
                                 // call must return a SYNC_ERR_CONFLICT
                                 // exception.
) = 0;
```

Sync engine object 124 implements another interface 230 that server sync agent 128 and client sync agent 164 can call when they detect local changes that need to be synchronized to each other via synchronization server 122. Server sync agent 128 and client sync agent 164 work in conjunction with each other to implement interface 232 that sync engine object 124, can use to insert, update, and/or delete email, data, and calendar records. In accordance with an embodiment of the invention, data is passed along interface 230 by function calls between a local interface in sync engine object 124 on synchronization server 122 and client interface 346 on mobile device 160. In an embodiment, the functional components of interface 230 are depicted as pseudo-code below:

```
// Called by a device when a new or modified data object has been detected
    virtual void ClientRecordChanged(
        char* DevId,                 // (in) the full device ID with the
modified/new data object
        eSyncData storeType DsType,  // (in) the data store with the modified/new
data object
        CmoBinary& Id,               // (in) the data object ID
        CmoBinary& RecordData,       // (in) the data object contents
        tSyncRecordVer Version       // (in) the current version of the data
object
        ) = 0;
// called by a device when a data object has been deleted
    virtual void ClientRecordDeleted(
        char* DevId,                 // (in) the full device ID with the
modified/new data object
        eSyncData storeType DsType,  // (in) the data store with the modified/new
data object
        CmoBinary& Id                // (in) the data object ID
```

-continued

```
    ) = 0;
    // Called by a server listener when a new or modified data object has been
detected
    virtual void ServerRecordChanged(
        UI32 DevId,                      // (in) the device ID with the modified/new
data object (unique int device ID as stored in database)
        eSyncData storeType DsType,      // (in) the data store with the modified/new data object
        CmoBinary& Id,                   // (in) the data object ID
        CmoBinary& RecordData,           // (in) the data object contents
        tSyncRecordVer Version           // (in) the current version of the data
object
    ) = 0;
    // called by a server listener when a data object has been deleted
    virtual void ServerRecordDeleted(
        UI32 DevId,                      // (in) the device ID with the modified/new
data object (unique int device ID as stored in database)
        eSyncData storeType DsType,      // (in) the data store with the modified/new
data object
        CmoBinary& Id                    // (in) the data object ID
    ) = 0;
```

Figure 4:
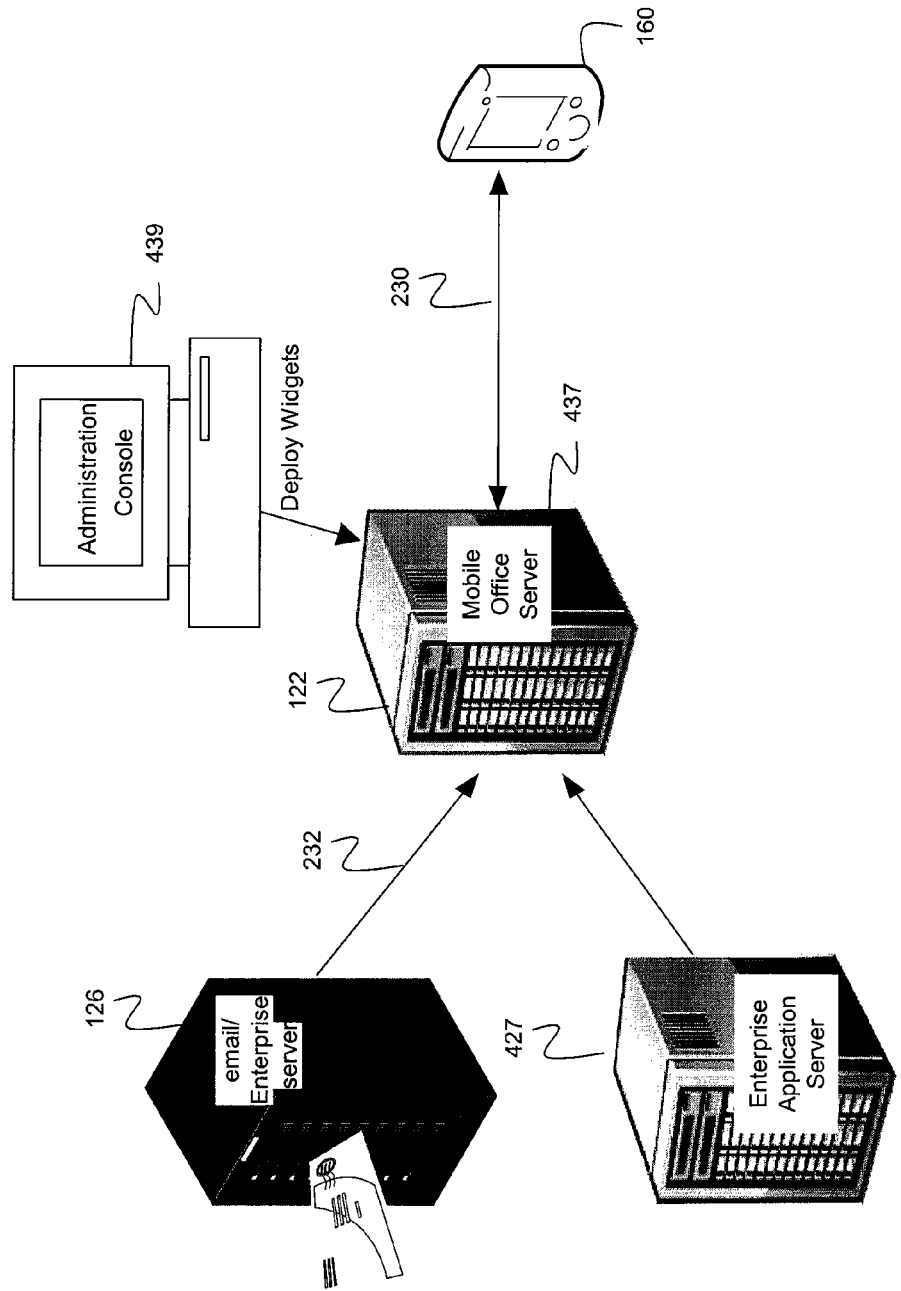
FIG. 4 illustrates a modular view of a business process mobilization and application workflow system, in accordance with an embodiment of the present invention.

FIG. 4 depicts business process mobilization and application workflow system 400 which facilitates application workflow and application synchronization between mobile device 160 and enterprise application server 427. FIG. 4 is described with continued reference to the embodiments illustrated in FIGS. 1-3. However, FIG. 4 is not limited to those embodiments. In accordance with an embodiment of the present invention, mobile office server 437 resident on synchronization server 122 facilitates calls between email/back end server 126, enterprise application server 427, and mobile device 160.

According to an embodiment of the present invention, business process widgets are deployed to mobile device 160 and stored in a client-side enterprise mobility framework container resident on mobile device 160. For example, an enterprise mobility framework container is local to mobile device 160 and may be integrated with an email or messaging inbox on mobile device 160. In another embodiment, the enterprise mobility framework container is local to mobile device 160 and is a standalone application on mobile device 160. Business process widgets are deployed from administration console 439. Administration console 439 may be a separate computer or server accessible by administrators responsible for deploying business process widgets. Alternatively, administration console 439 may be a user interface accessible by administrators responsible for deploying business process widgets. According to an embodiment, business process widgets deployed by administration console 439 provide native customization through extensions registers. Mobile office server 437 stores business process widgets and delivers them to mobile device 160.

The Enterprise mobile framework container on mobile device 160 interprets the content and data flow of business widgets delivered from mobile office server 437 via interface 230. Mobile office server 437 also provides rendering information to mobile device 160. In an embodiment, the rendering information is provided through XML documents. Business process widgets also contain flow-control information and action description properties.

Synchronization of data objects, business processes, applications, and application data between server 126 and mobile device 160 is performed as described above with respect to FIGS. 2 and 3. Data objects to be synchronized, such as email messages and calendar entries, are sent via interface 232 between email server 126 and synchronization server 122. Similarly, data objects to be synchronized are sent between mobile device 160 and synchronization server 122 via interface 230. In embodiments of the present invention, data object synchronization systems 200 and 300 depicted in FIGS. 2 and 3 are used to deliver applications from enterprise application server 427 to mobile device 160, wherein the applications include rendering components, execution logic, application data, and Input/Output (I/O) parameters. For example synchronization systems 200 and 300 deliver applications and application data from enterprise application server 427 to mobile device 160 via synchronization server 122. Similarly, synchronization systems 200 and 300 deliver application workflow events (business process events) from mobile device 160 to enterprise application server 427 via synchronization server 122. In an embodiment, synchronization server 122 contains a mobile office server 437 which coordinates delivery of applications and application data between mobile device 160 and enterprise application server 427. Mobile office server 437 may be software resident on synchronization server 122. In an embodiment not depicted in FIG. 4, mobile office server may be a distinct, separate server and not resident on synchronization server 122.

When an application is executed on mobile device 160, the corresponding application workflow event is executed again on enterprise application server 427 by sending application data and I/O parameters from mobile device 160 to enterprise server 427 via synchronization server 122. In an embodiment, I/O parameters such as data entry and results for an application executed on mobile device 160 are captured and sent to enterprise application server 427 via synchronization server 122. The captured I/O parameters are used on enterprise application server 427 to execute the corresponding enterprise edition or version of the application that was executed on mobile device 160. In this way, the application is 'synchronized' between mobile device 160 and enterprise application server 427 by effectively re-running the application using the same data input by a user of mobile device 160 and with the same result/output parameters captured on mobile device 160. According to an embodiment, data object synchronization systems 200 and 300 synchronize applications by re-running applications on enterprise server 427 using input and output captured on mobile device 160 where the applications were previously run.

According to embodiments of the present invention, data object synchronization systems 200 and 300 are used to deliver business process widgets between mobile office server 437 and mobile device 160.

Figure 5:
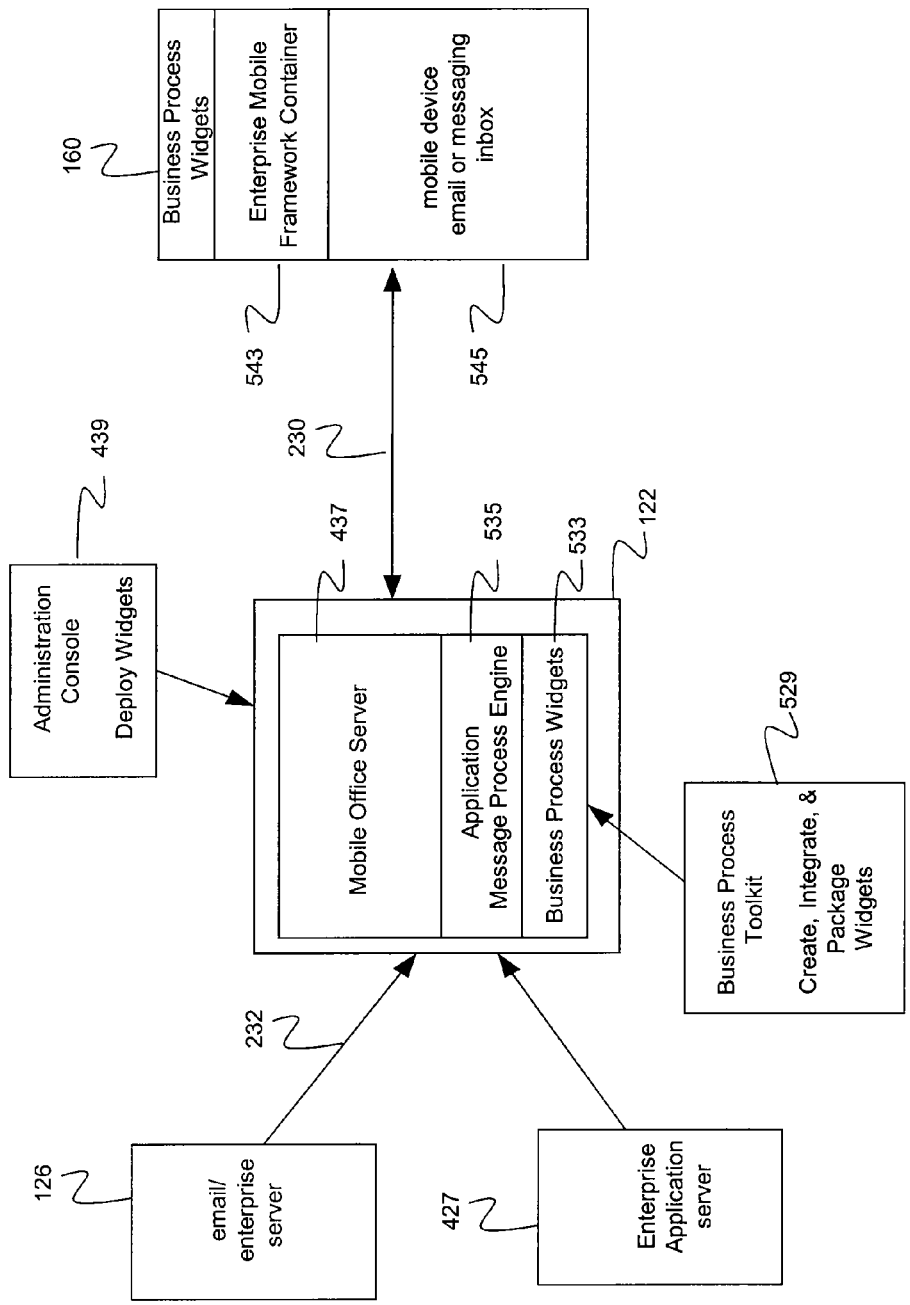
FIG. 5 depicts a business process mobilization and application workflow architecture, in accordance with an embodiment of the present invention.

FIG. 5 depicts the components business process widget and application workflow system 500. Business process mobilization and application workflow system 500 mobilizes business processes and facilitates synchronization of application workflow events between mobile device 160 and enterprise application server 427. FIG. 5 is described with continued reference to the embodiments illustrated in FIGS. 1-4. However, FIG. 5 is not limited to those embodiments. According to an embodiment, mobile office server 437 on synchronization server 122 facilitates calls between email/enterprise server 126, enterprise application server 427, and mobile device 160.

Components on synchronization server 122 enable application workflow events and business process widgets to be synchronized between mobile device 160 and enterprise application server 427.

Mobile office server 437 includes server-side widget repository 533 to store business process widgets deployed by administration console 439. Repository 533 includes information to correlate individual business process widgets to known mobile office users. Repository 533 also contains widget version information to enable versioning of business process widgets. Repository 533 is available to users and processes via single sign-on (SSO) interfaces.

Mobile office server 437 also includes application message process engine 535 which facilitates application workflow event synchronization via email messages. Application message process engine 535 presents email messages with a custom view based on the application workflow event being synchronized. Application message process engine 535 also provides actionable-responses from mobile device 160 in order to complete business processes. In an embodiment, application message process engine 535 accomplishes this application workflow event synchronization through mobile web services. Application message process engine 535 consolidates the application workflow event synchronization between mobile device 160 and enterprise application server 427 in a mobile device email inbox 545. Mobile device email inbox 545 is a single inbox on mobile device 160 used to receive email messages, applications, and business widgets from mobile office server 437.

Enterprise mobile framework container 543 is a client-side data container resident on mobile device 160. According to one embodiment of the present invention, enterprise mobile framework container 543 may be integrated with mobile device email or messaging inbox 545. In another embodiment, enterprise mobile framework container 543 is an independent application not integrated with email or messaging inbox 545. Enterprise mobile framework container 543 also provides native customization for applications on mobile device 160 through extensions. Enterprise mobile framework container 543 registers and interprets business widget content and flow received from mobile office server 437.

In an embodiment, there are server components on enterprise application server 427 to integrate applications executed on mobile device 160 with back-end applications and web application that combine data from more than one source into a single integrated tool, such as a Mash-up technologies. This back-end integration is configured by business process toolkit 529 which allows administrators to dynamically create applications. Business process toolkit 529 ties enterprise applications resident on enterprise application server 427 to standard interfaces. In an embodiment, web services and data objects such as business process 'widgets' are delivered to enterprise application server 427 in a form that executes on enterprise application server 427 after delivery from mobile device 160 with the I/O parameters that were used and captured on mobile device 160.

In an embodiment, business widget and application workflow event synchronization leverages data object synchronization system 300 by using e-mail for notifications and alerting regarding application execution.

III. Function Calling Sequences

Figure 6:
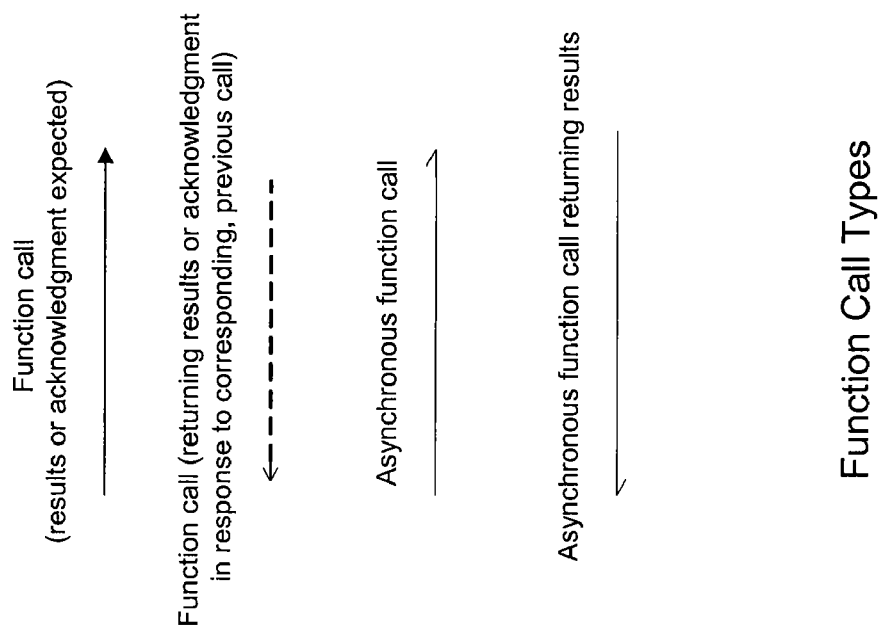
FIG. 6 provides a legend for function calls depicted in the message sequence charts of FIGS. 7 and 8.
Figure 7:
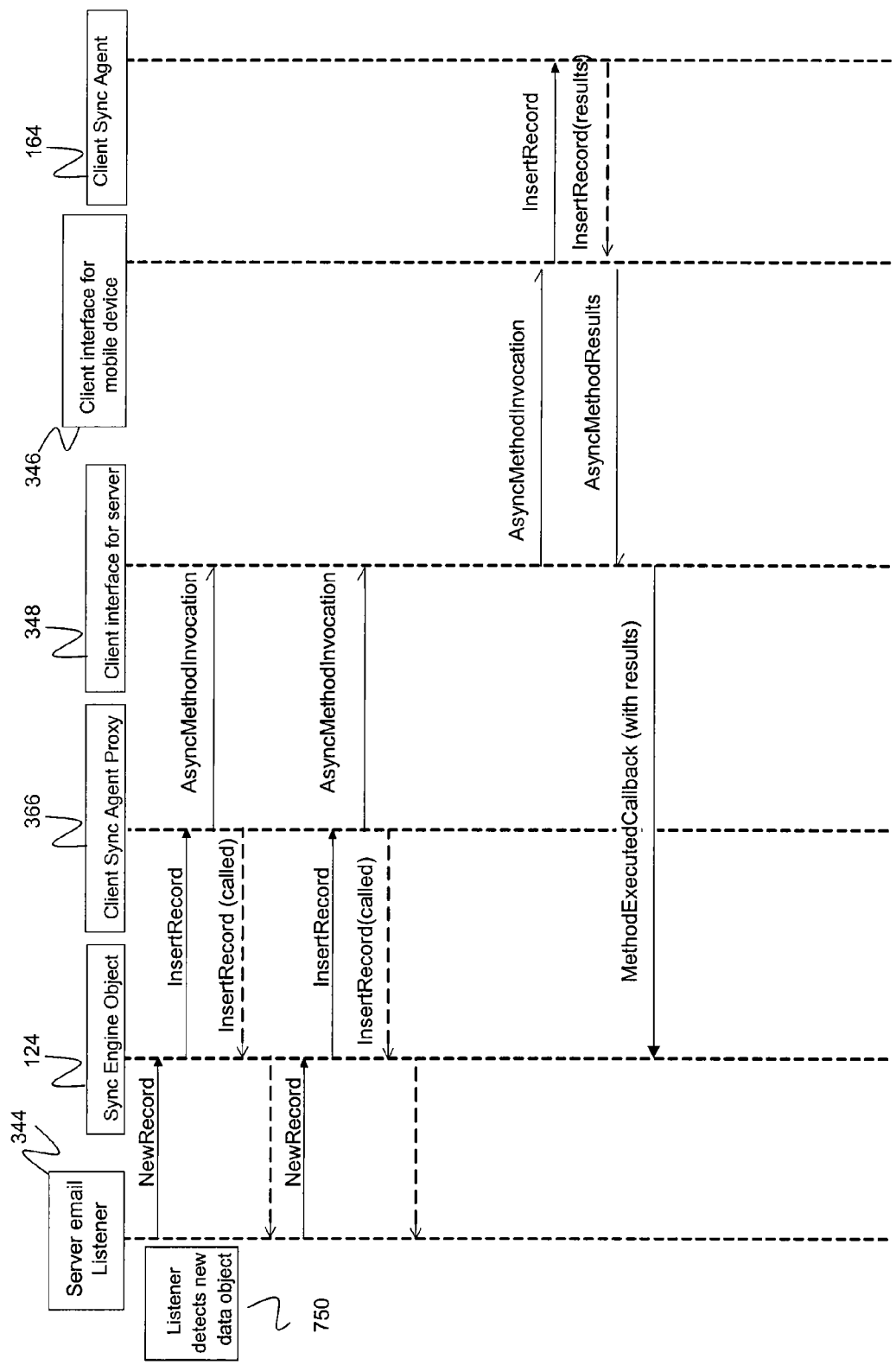
FIG. 7 provides a Message Sequence Chart (MSC) of synchronizing a newly-composed email between a mobile device and an email server, in accordance with an embodiment of the present invention.
Figure 8:
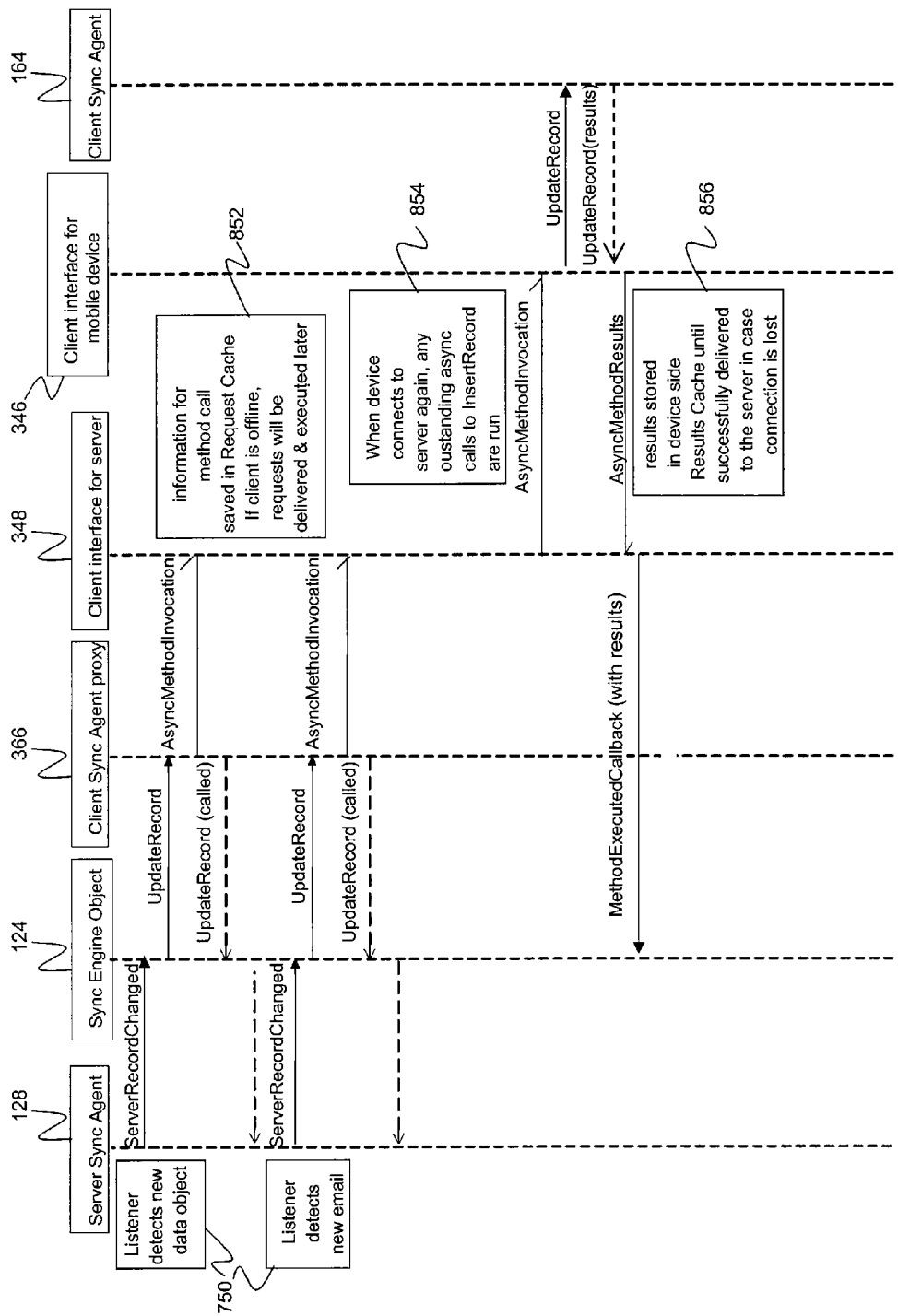
FIG. 8 provides an MSC of synchronizing data objects between mobile devices and servers, in accordance with an embodiment of the present invention.

FIG. 6 contains a key 600 illustrating four different items used to depict function calls and invocations in the message sequence charts of FIGS. 7 and 8. Key 600 includes a function call where a result or an acknowledgement is expected in return, a function call returning a result or acknowledgment, an asynchronous function call, and an asynchronous function call returning results.

FIG. 7 is a message sequence chart (MSC) 700 depicting the initial calling sequence that occurs when a new email arrives on an email server and is synchronized to a mobile device, in accordance with an embodiment of the invention. FIG. 7 is described with continued reference to the embodiments illustrated in FIGS. 1-3. However, FIG. 7 is not limited to those embodiments. FIG. 7 illustrates the calling sequence for a scenario where a user of mobile device 160 receives a new email on email server 126 and then mobile device 160 connects at a subsequent time and gets the email.

In step 750, when server email listener 344 detects a new email, it reports the new email to sync engine object 124 by calling the NewRecord function. Next, sync engine object 124 will create an instance of the client sync agent object for the appropriate device and call the InsertRecord function.

In accordance with an embodiment, this InsertRecord call is made as an asynchronous guaranteed delivery function call. For now, email listener 344 on email server 126 is finished.

Client sync agent proxy 366 represents the proxy object used to reach the client sync agent 164 that is running on a mobile device such as mobile device 160. At this point, client sync agent proxy 366 initiates AsyncMethodInvocation call to client interface for server 348. This function call is asynchronous and guaranteed to succeed, so at this point client sync agent proxy 366 returns results from the InsertRecord function call.

In accordance with an embodiment of the present invention, information for the AsyncMethodInvocation method call is saved in the Request Cache, and when the mobile device hosting the client interface for mobile device 246 is offline, the request in AsyncMethodInvocation will be delivered and executed by client sync agent 164 at a later time.

Once the client-side InsertRecord call has been executed by client sync agent 164, client sync agent 164 will run a callback on sync engine object 124 to inform it that the InsertRecord call has been completed.

When a new email is composed on mobile device 160, the function sequence described above runs in reverse. In this way, email synchronization between mobile devices and email servers is handled in a symmetrical manner. In an embodiment, the function invocations depicted in FIGS. 7 and 8 may be web service requests from synchronization server 122 or email server 126 that occur once mobile device 160 connects to a network such as network 172 depicted in FIG. 1. Similarly, the function calls in FIGS. 7 and 8 may be web service requests from a mobile device 160 to an email server 126 occurring when mobile device 160 connects to network 172. According to an embodiment, these symmetrical web requests occur when new emails either arrive at email server 126 or are composed on mobile device 160. This symmetrical calling sequence is described in greater detail with reference to FIG. 7 below.

FIG. 8 is a message sequence chart (MSC) 800 depicting the function calling sequence that occurs when new emails and data objects arrive on a server and are synchronized to a mobile device, in accordance with an embodiment of the invention. FIG. 8 is described with continued reference to the embodiments illustrated in FIGS. 1-3. However, FIG. 8 is not limited to those embodiments.

As depicted in FIG. 8, a server such as email server 126 makes a request to a client such as mobile device 160 via sync engine object 124. The function calling sequence begins when the server side listener detects a new or updated data object. Upon detection 850 of a new or updated data object, the server side listener reports the new or updated data object to local server sync agent 128. Next, server sync agent 128 calls the ServerRecordChanged function in order to pass the new or updated data object to sync engine object 124.

According to an embodiment, sync engine object 124 will then look into its local ID map (described below in section IV.) to determine if the data object has already synchronized this particular data object to the mobile device. Sync engine object 124 will then use a call to invoke the UpdateRecord method on client sync agent 164. When the sync engine object 124 determines that there is no existing record ID mapping in its ID map, it will use an empty RecordId in the call to UpdateRecord.

Client sync agent proxy 366 is the proxy object that is used to reach the client sync agent 164 running on mobile device 160. According to the embodiment depicted in FIG. 8, client sync agent proxy 366 initiates an AsyncMethodInvocation call to the client interface for server 348. This function call is asynchronous and guaranteed to succeed, so at this point sync engine object 124 returns from the ServerRecordChanged function call.

In step 852, information for the AsyncMethodInvocation method call is saved in the Request Cache, and if the mobile device hosting the client interface for mobile device 246 is offline, the request in AsyncMethodInvocation will be delivered and executed by client sync agent 164 later.

When client sync agent 164 receives the call to UpdateRecord, it may use the PIM data store objects to insert the data object into its mobile PIM data store, such as mobile PIM data store 318 depicted in FIG. 3. In step 854, when the mobile device connects to the server running server sync agent 128, the outstanding AsyncMethodInvocation call to InsertRecord is run to insert the new data object on the mobile device.

After the data object is inserted, client sync agent 164 knows the real RecordID that was used for the new object so that client sync agent 164 can return the new RecordId for the output ID argument in the UpdateRecord results.

In step 856, results are stored in the Results Cache on the mobile device running client sync agent 164 until they are successfully delivered to the server in case the connection to the server is lost.

At this point, if the client is connected to the server, UpdateRecord results are passed from client sync agent 164 back to sync engine object 124 via an UpdateRecord call. Once synchronization server 122 has the results from this UpdateRecord call, it will run a callback on sync engine object 124 to indicate that an outstanding call has completed. Then, sync engine object 124 can retrieve the results from an UpdateRecord(GetResults) call.

Once sync engine object 124 has the results and the new RecordID that mobile device 160 actually used, it can update the mapping in its local ID map so that mobile device 160 knows the device local unique identifier (LUID) in case the data object later needs to be updated or deleted. Once sync engine object 124 has processed the results of this UpdateRecord call, it informs client sync agent 164 that it has finished processing the Asynchronous results from the previous UpdateRecord call via an UpdateRecord(finished) call so that synchronization server 122 can clean up by removing the data from the Results Cache.

The function call sequence described above runs in reverse when a user composes a new email, creates a new data object, or updates a data object on mobile device 160. This calling sequence is described in the following paragraphs, but is not depicted in FIG. 8.

When a user composes a new email on mobile device, such as mobile device 160, a new or modified data object is detected and client sync agent 164 calls the ClientRecordChanged function in order to pass the new email to client interface for mobile device 246.

At this point, according to an embodiment, client interface for mobile device 246 will look into its local ID map to determine if it has already synchronized this particular data object to the server. The client interface for mobile device 246 will then use a call to invoke the UpdateRecord method in sync engine object 124. If the client interface for mobile device 246 determines that there is no existing record ID mapping in its ID map, it will use an empty RecordId in the call to UpdateRecord.

Client sync agent proxy 366 also represents the proxy object used to reach the server sync agent 128 that is running on a server such as email server 126. At this point, client sync agent proxy 366 initiates AsyncMethodInvocation call to the interface for server 348. This function call is asynchronous and guaranteed to succeed, so at this point sync engine object 124 returns from the ServerRecordChanged function call.

When sync engine object 124 receives the call to UpdateRecord, it will insert the data object into its server email database or PIM data store, such as email database 340 and PIM data store 342 depicted in FIG. 3. After the data object is inserted, sync engine object 124 knows the real RecordID that was used for the new email so that client interface for server 348 can return the new RecordId for the output ID argument in the UpdateRecord results returned to client sync agent 164.

Once client sync agent 164 has the results and the new RecordID that email server 126 actually used, it can update the mapping in its local ID map so that mobile device 160 knows the device local unique identifier (LUID) in case the data object later needs to be updated or deleted. Once client sync agent 164 has processed the results of this UpdateRecord call, it informs server sync agent 128 that it has finished processing the Asynchronous results from the previous UpdateRecord call via an UpdateRecord(finished) call so that synchronization server 122 can clean up by removing the data from the Results Cache.

As synchronization system 300 depicted in FIG. 3 supports prioritizing asynchronous messages, sync engine object 124 will prioritize items according to data store type (email have priority over tasks in an embodiment) and according to operation type (e.g., insert, update, or delete). If a data object is date-based (such as an email message or calendar entry), it will also prioritize based on how 'current' the timestamp of the data object is. For example, in accordance with an embodiment, email messages, applications, business widgets, and calendar entries received today will be synchronized and will be delivered sooner than items that were received prior to today.

IV. Data Object Identification Handling

In accordance with an embodiment of the present invention, the sync engine object on the synchronization server maintains a table in a database or data store that contains mapping information used to correlate which unique record identifiers (RecordIDs) from a given server sync agent on an email server correspond to which record identifiers in a given client sync agent on a mobile device that is being synchronized with the email server.

With reference to the embodiment depicted in FIG. 3, sync engine object 124 maintains a table in database 314 that contains information about which RecordIDs from server sync agent 128 on email server 126 correspond or map to which RecordIDs in client sync agent 164 on mobile device 160. In order to reduce the amount of extra data that is needed to be kept in databases or data stores on mobile device 160 and in email database 340 or PIM data store 342 on email server 126, sync engine object 124 is responsible for maintaining the mapping between RecordIDs from email server 126 and mobile device 160.

In an embodiment, the ID mapping table is defined as depicted in Table 1. According to an embodiment, the ID mapping table may be a relational database table. In another embodiment, the ID table may be in a data store accessible by the sync engine object.

TABLE 1

| ID Mapping Table Columns | | |
| --- | --- | --- |
| ServerLUID | ClientLUID | DatastoreType |

When a new data object is being synchronized between a server and a mobile device, a new row is inserted into the ID mapping table with a temporary ID entered in the appropriate ServerLUID or ClientLUID column based on where the insert came from. After the data object has been successfully inserted and the sync engine object has the results of the insert (including the actual record ID), the sync engine object will replace the temporary ID with the actual ID.

When the sync engine object is notified of a modified data object, it will look up the ID in the ID mapping table. If the sync engine object finds a match, then it looks up the matching ID for the given client sync agent and forwards the update using the appropriate local unique identifier (LUID). If the LUID changes after the update has occurred, the sync engine object will know about the new ID in the results of the method call. From here, the sync engine object can update the LUID in the ID mapping table. After a delete has successfully executed on the appropriate client sync agent, the sync engine object will remove the row from the ID mapping table.

A potential problem with the approach described above is that due to the asynchronous nature of the synchronization process, it is possible for the client sync agent to report a new data object followed shortly afterwards by a modification or update of the same data object. If this occurs shortly before the mobile device goes off-line or the device is temporarily disconnected from the network, the sync engine object will not yet know the actual LUID that was used for the data object since the sync engine object only has the temporary ID stored in the ID mapping table. A similar problem can happen in cases where two consecutive modifications or updates in a row occur and the first modification changes the LUID of the data object. The solution to this potential problem is described below.

To resolve the asynchronous new data object and consecutive update problem, the sync engine object uses a slightly different table to keep track of the temporary IDs and/or records that are currently in the process of being handled through asynchronous function calls. Rather than putting the temporary ID in the ClientLUID column of the ID mapping table as described above, the sync engine object inserts a new row into a second table that contains all outstanding synchronization requests. Only once the asynchronous call completes, the sync engine object will update its ID mapping table. If the sync engine object receives a second update, modification, or delete request from a client sync agent when the first operation is still in the process of being handled, it will queue an appropriate request to the other client sync agent to act on the data, but it will send the request as 'Paused' to the sync engine object. Queued requests that are paused are never sent to the client interface on the mobile device and/or the client interface on servers until they are resumed. Then on the sync engine object callback from the first request, the sync engine object will look through the second table for any additional queued requests for the same ServerLUID or DeviceLUID. If the IDs have not changed, it will simply resume the next request. If either ID has changed, the sync engine object will cancel the original request and re-submit it using the new IDs based on the previous change. According to an embodiment of the synchronization system, the sync engine object will change the function parameters and resume rather than canceling and resubmitting the request.

There exists a potential for timing problems when multiple, simultaneous changes are made to a data object wherein one of the changes is made on a mobile device that is offline (i.e., completely disconnected from the wireless network). For example, when an email message or calendar entry is composed, edited, or deleted on a mobile device that is not connected to the network and a simultaneous change occurs on the enterprise email server to the same message or calendar entry, there is potential for a synchronization conflict. Similarly, if two instances or copies of an application are being executed simultaneously on an enterprise application serve and on a disconnected mobile device, there is a synchronization timing problem associated with synchronizing the application data. Lastly, if a business process event is processed on a disconnected mobile device and a corresponding business process event is completed on an enterprise application server, a synchronization conflict arises when the mobile device reconnects to the network. Section V below describes how these potential timing problems are addressed in accordance with embodiments of the present invention.

V. Synchronization Conflict Handling

According to an embodiment, each call to the UpdateRecord or InsertRecord functions by a client sync agent includes an input/output parameter called SyncRecordVersion that is passed between the mobile device and the server via the synchronization server. This parameter represents a unique value associated with a given version of a data object being synchronized. In an embodiment, SyncRecordVersion is one or more of a data object checksum, LastMod timestamp, or a ChangeCounter integer. After an insert or update operation has finished storing the data object in a local data store on the mobile device, the client sync agent reads the current data object version from the mobile PIM data store and includes it in the response results sent back to the sync engine object. The sync engine object then stores this RecordVersion in the ID mapping table depicted in table 1 above.

According to an embodiment, when subsequent update or delete operations occur, the sync engine object will include the previous RecordVersion value it had saved in the ID mapping table. For example, when the client sync agent is processing the update or delete, it will query the current RecordVersion from the mobile PIM data store.

When there is a no conflict, the client sync agent expects the RecordVersion to still be the same as the previous value. If the current data object version does not equal the value sent from the synchronization server by the sync engine object, then a conflict exists for the operation.

In an embodiment, when a conflict situation arises, the client sync agent accesses pre-configured synchronization conflict resolution rules and applies them. According to an embodiment, a copy of the conflict resolution rules are stored in a local data store or database resident on the mobile device. The conflict resolution rules may also be stored and configured on the synchronization server. For example, the conflict resolution rules may be stored in database 314 of synchronization server 122. If a conflict rule is configured such that the server wins, and the client sync agent detected the conflict, the client sync agent will proceed with the update from the server and overwrite the current data object (i.e., the server's data object will overwrite the conflicting data object on the mobile device). For example, consider a case where a data object has already been synchronized between the client and the server. In this example, the sync engine object contains the information in the ID mapping table depicted in table 2 below.

TABLE 2

ID Mapping Table After Sync between client and server

| ServerLUID | Server RecVer | ClientLUID | ClientRecVer | DatastoreType |
|---|---|---|---|---|
| ABCD | V001 | 123 | V100 | Calendar |

Assume that a client sync agent discovered the change first and reported it to the sync engine object. The sync engine object will send an UpdateRecord to the client sync via an invocation of the UpdateRecord function with the following parameters: Calendar, 123, data, and V100. At this point the sync engine object will have the values depicted in table 3 in its ID mapping table and will have the values listed in table 4 in its Queued Request table.

TABLE 3

ID Mapping Table at sync engine object

| ServerLUID | Server RecVer | ClientLUID | ClientRecVer | DatastoreType |
|---|---|---|---|---|
| ABCD | V001 | 123 | V100 | Calendar |

TABLE 4

Queued Requests Table at sync engine object

| ServerLUID | Server RecVer | ClientLUID | ClientRecVer | DatastoreType | Request ID | Status |
|---|---|---|---|---|---|---|
| ABCD | V002 | 123 | V100 | Calendar | Reqid1 | Active |

Now assume that the sync engine object receives another update from the client sync agent indicating the client change. As the sync engine object already has a request queued for this particular data object, it will add another record to its ID mapping table as shown in Table 5 and will add a corresponding record to its Queued Requests table as shown in table 6.

TABLE 5

ID Mapping Table at sync engine object after client change

| ServerLUID | Server RecVer | ClientLUID | ClientRecVer | DatastoreType |
|---|---|---|---|---|
| ABCD | V001 | 123 | V100 | Calendar |

TABLE 6

Queued Requests Table at sync engine object after client change

| ServerLUID | Server RecVer | ClientLUID | ClientRecVer | DatastoreType | Request ID | Status |
|---|---|---|---|---|---|---|
| ABCD | V002 | 123 | V100 | Calendar | Reqid1 | Active |
| ABCD | V001 | 123 | V200 | Calendar | Reqid2 | Paused |

In an embodiment, if a user on the mobile device subsequently modifies an email message, business widget, application input, or calendar entry on the mobile device and the server at approximately the same time, then the actual server RecVer will now be V002 and the client RecVer will now be V200. In this scenario the sync engine object will not know about either one the server RecVer of V002 or the client RecVer of V200 at this point.

The client sync agent will eventually receive the queued update request. The RecVer sent by the sync engine object was V100, but according to the current state of the actual data, the RecVer is V200. Thus it is in conflict. Assuming that Server Wins was configured, the client overwrites the data object with the current data from the sync engine object and returns the results.

When the sync engine object processes the results of the client update, it updates the ID mapping table accordingly and resumes the previously-paused request. Now the sync engine object ID mapping and Queued Requests tables contain the rows listed in tables 7 and 8, respectively. As shown in tables 7 and 8, the Client RecVer is updated again.

TABLE 7

ID Mapping Table at sync engine object after server wins

| ServerLUID | Server RecVer | ClientLUID | ClientRecVer | DatastoreType |
|---|---|---|---|---|
| ABCD | V002 | 123 | V300 | Calendar |

TABLE 8

Queued Requests Table at sync engine object after server wins

| ServerLUID | Server RecVer | ClientLUID | ClientRecVer | DatastoreType | Request ID | Status |
|---|---|---|---|---|---|---|
| ABCD | V001 | 123 | V200 | Calendar | Reqid2 | Active |

Now the sync engine object sends server sync agent makes the following call to the UpdateRecord function: UpdateRecord(Calendar, ABCD, data, V001). When the server sync agent handles this update request, it checks the current Record Version and notices that it is actually V002. Since the server sync agent knows that the conflict rules configuration dictates that the server wins, the server sync agent will ignore the UpdateRecord call and will return a value or acknowledgment indicating that the call was successful but skipped.

As the sync engine object also knows the conflict resolution rules, it could have also chosen to cancel this request rather than sending it along and marking it as active.

Now the sync engine object ID mapping table contains the record shown in Table 9, the Queued Requests table is empty as shown in Table 10, and the data object is synchronized on both the mobile device and the server.

TABLE 9

ID Mapping Table at sync engine object after synchronization

| ServerLUID | Server RecVer | ClientLUID | ClientRecVer | DatastoreType |
|---|---|---|---|---|
| ABCD | V002 | 123 | V300 | Calendar |

TABLE 10

Empty Queued Requests Table at sync engine object after synchronization

| ServerLUID | Server RecVer | ClientLUID | ClientRecVer | DatastoreType | Request ID | Status |
|---|---|---|---|---|---|---|

VI. Synchronization Methods

Figure 9:
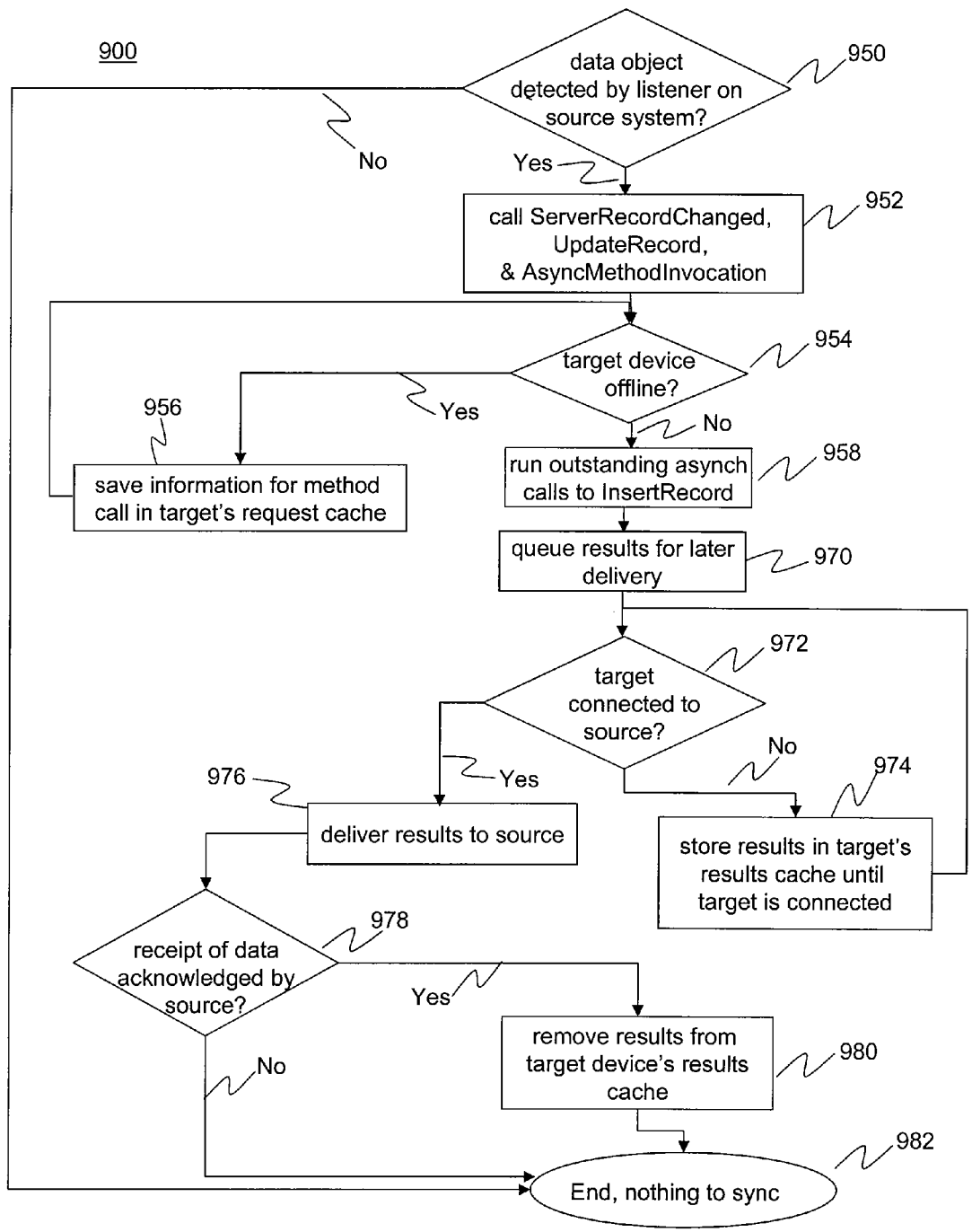
FIG. 9 is a flowchart illustrating steps by which data objects are asynchronously synchronized between mobile devices and servers, in accordance with an embodiment of the present invention.

FIG. 9 is a flowchart 900 illustrating steps by which a synchronization method is used to synchronize communications between a mobile device and a back end email or enterprise application server, in accordance with an embodiment of the present invention.

More particularly, flowchart 900 illustrates the steps by which the synchronization of new data object between a mobile client device and a server is performed, according to an embodiment of the present invention. According to an embodiment, the 'new' data object can be one or more of a new, updated, or deleted data object. In an embodiment the new data object can be one or more of an email message, a web service request, an application, application data, a business process event, a calendar entry, a data file, a data store record, and a database record. The synchronization method synchronizes data objects between a source system and a target system. As the synchronization method is symmetrical, a mobile client device may be either the source of or the target for a data object to be synchronized. Similarly, a server such as an email server or an enterprise application server can be the source of or the target for a data object to be synchronized. The synchronization method also synchronizes application workflows and business process widgets between a source system and a target system. According to an embodiment of the present invention, the target and source systems are either a mobile client device or a server. For example, the target and source systems can be either a mobile client device or an enterprise application server. Note that the steps in the flowchart do not necessarily have to occur in the order shown.

The method begins at step 950 where an evaluation is made regarding whether a new data object has been created on the source system. In step 950, the creation of the new data object is detected by a listener. If it is determined that a new data object on the source system needs to be synchronized, control is passed to step 952. If it is determined that no new data object needs to be synchronized, then control is passed to step 982 where the method ends.

In step 952, methods are called to indicate the existence of the new source system data object to the target system. As the synchronization method is symmetrical, the mobile client device may be either the source of or the target for the new data object detected in step 950. According to an embodiment, the functions include ServerRecordChanged, UpdateRecord, and an asynchronous AsyncMethodInvocation function.

In step 954 an evaluation is made regarding whether the target involved in the synchronization is offline. For example, if the target is a mobile client device, it may be offline due to being shut down or rebooted by a user. If the target is a server, it may be temporarily offline due to a scheduled shutdown (i.e., for scheduled maintenance) or an unscheduled reboot/restart. If it is determined that the target is offline, control is passed to step 956. If it is determined that the target is online, then control is passed to step 958.

In step 956, information needed for the method calls on the target are saved in the target system's request cache while the target is offline. In an embodiment, control is passed back to step 954 based upon events (i.e., triggered by events) to determine if the target system is still offline. In another embodiment, step 954 is repeated on-demand and not event-based. In an alternative embodiment, control is passed back to step 954 at a timed interval that is tunable. In another embodiment, the interval varies based on factors including one or more of the number of method calls queued in the target system's request cache, the type of method calls (i.e., insert, modify, delete) in the cache, the characteristics (i.e., memory size, CPU speed, storage capacity, network connectivity) of the target system, and other factors.

In step 958, outstanding asynchronous calls to InsertRecord are made. This step is performed after the target is online. In this step, once the target is online and receives a request to make a method call, the method call is made on the target, the method is executed on the target, and the control is passed to step 970 where the results of the method call will be queued until the target is connected to the source system. Any asynchronous calls queued in the target system's request cache are made in this step and control is passed to step 970.

In step 970, results from the method calls of step 958 are saved and queued in the results cache of the target system and control is passed to step 972.

In step 972 an evaluation is made regarding whether the target system involved in the synchronization can connect to the source system. For example, in this step it is determined whether a target system can connect to a source system via a wireless network, a wide area network (WAN), the Internet, and/or a corporate network/intranet. If it is determined that the target cannot connect to the source system, control is passed to step 974. If it is determined that the target system can connect to the source system, then control is passed to step 976.

In step 974, results from the method calls completed in step 958 are stored in the target system's results cache while the target system cannot connect to the source system. In an embodiment, control is passed back to step 972 to determine if the target system is still disconnected from the source system. According to embodiments of the invention, repetitions of the evaluation in step 972 are on-demand or event-based. In an alternative embodiment, control is passed back to step 972 at tunable, timed intervals. In another embodiment, frequency of repetition of step 972 varies based on factors including one or more of the amount of results stored in the target system's results cache, the type of method call results (i.e., results of data object insertions, modifications, or deletions) in the results cache, the characteristics (i.e., memory size, CPU speed, storage capacity, network connectivity) of the target system, and other factors.

In step 976, the results of the method call queued in step 970 are delivered to the source system and control is passed to step 978.

In step 978, an evaluation is made regarding whether the receipt of results data delivered in step 976 have been acknowledged by the server. If it is determined that the server has acknowledged receipt of the results data, control is passed to step 980. If it is determined that the server has not acknowledged receipt of the data, then control is passed to step 982 where the method ends.

In step 980, results are removed from the target system's results cache and control is passed to step 982 where the method ends.

Figure 10:
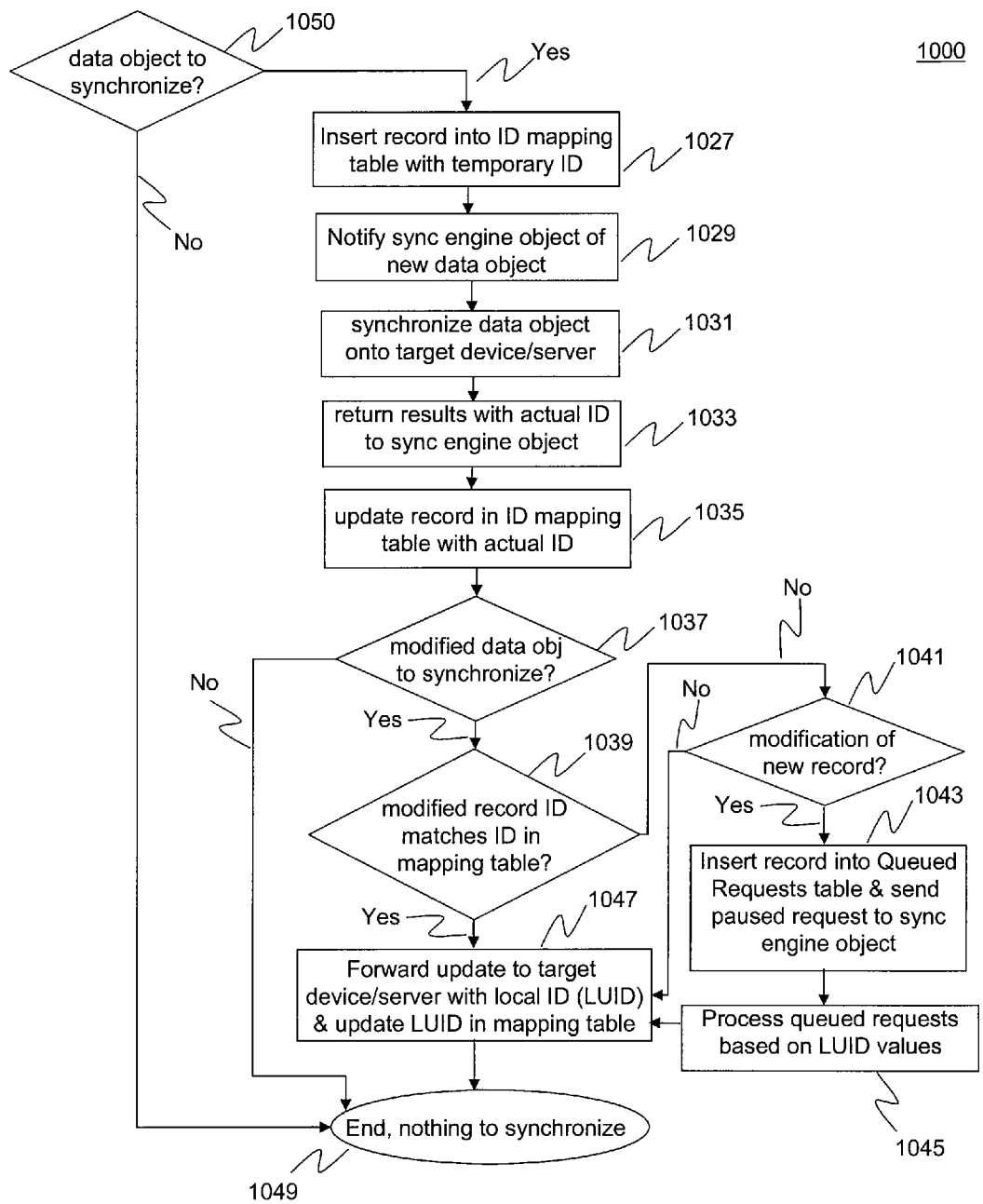
FIG. 10 is a flowchart illustrating steps by which data objects are symmetrically synchronized between mobile devices and servers, in accordance with an embodiment of the present invention.

FIG. 10 is a flowchart 1000 illustrating steps by which new records are synchronized between a mobile device and a server such as a back end email server or an enterprise application server, in accordance with an embodiment of the present invention.

More particularly, flowchart 1000 illustrates the steps by which the synchronization method for new data objects, including new, updated, and deleted email messages, calendar entries, data files, and database records, is performed, according to an embodiment of the present invention. The synchronization method synchronizes multiple new records between a source system and a target system. The method also handles cases where a new data object to be synchronized is subsequently modified before the synchronization is complete. The synchronization method also synchronizes application workflows and business process widgets between a source system and a target system. According to an embodiment of the present invention, the target and source systems are either a mobile client device or an email server. In another embodiment, the target and source systems are either a mobile client device or an enterprise application server. Note that the steps in flowchart 1000 do not necessarily have to occur in the order shown.

The method begins at step 1050 where an evaluation is made regarding whether a new data object has been created on the source system. In step 1050, the creation of the new data object is detected by a listener. If it is determined that a new data object on the source system needs to be synchronized, control is passed to step 1027. If it is determined that no new data object needs to be synchronized, then control is passed to step 1049 where the method ends.

In step 1027, a temporary record identifier (record ID) for the new data object detected in step 1050 is inserted into an ID mapping table.

In step 1029, a sync engine object on a synchronization server is notified of the new data object detected in step 1050. According to an embodiment, the synchronization server may be one or more computers. In another embodiment, the synchronization server may be a virtual machine running on the email server. Conversely, the functionality of the email server may also be running on the synchronization server. In another embodiment, the synchronization server may include a mobile office server configured to synchronize application workflows and business process widgets.

In step 1031, the new data object is synchronized onto the target system by inserting it on the target system, wherein the target system is one of a mobile client device, an email server, or an enterprise application server.

In step 1033, results are returned to a sync engine object resident on a synchronization server, wherein the results include at least the actual record ID from the target system.

The method continues in step 1035 where the ID mapping table used by the sync engine object is updated with the actual record ID from the target system.

In step 1037 an evaluation is made regarding whether a data object has been modified on a source system. If it is determined that a modified data object on the source system needs to be synchronized, control is passed to step 1039. If it is determined that no modified data object needs to be synchronized, then control is passed to step 1049 where the method ends.

In step 1039 an evaluation is made regarding whether the record ID of the modified data object matches the corresponding record ID stored in the sync object engine's ID mapping table. If it is determined that the modified data object's record ID matches the record ID in the ID mapping table, control is passed to step 1047. If it is determined that the modified data object's record ID does not match the record in the ID mapping table, then control is passed to step 1041.

Step 1047 is further described below.

In step 1041 an evaluation is made regarding whether the new data object detected in step 1050 is the same data object whose modification was detected in step 1037. If it is determined that the new data object is being modified, control is passed to step 1043. If it is determined that the new data object is not the data object being modified, then control is passed to step 1047.

Step 1047 is further described below.

In step 1043, a new record is inserted into a Queued Requests table and a 'paused' request is sent to the sync engine object. According to an embodiment, queued requests that are paused are not sent to a client interface on the target system (mobile device, email server, or enterprise application server) until the requests are resumed.

In step 1045, the queued requests are processed. In this step, the queued requests are identified by querying the Queued Requests table populated in step 1043. In an embodiment, the sync engine object compares the local unique IDs (LUIDs) for server records (identified by a ServerLUID column) and mobile device (identified by a DeviceLUID column) records in the Queued Requests table. If the ServerLUID and DeviceLUID IDs have not changed, the sync engine object will 'resume' the next request in the Queued Requests table and the request will be processed. If either the ServerLUID or DeviceLUID has changed, the sync engine object will cancel the original request and resubmit the request by passing control to step 1047 using the new LUIDs based on the modification detected in step 1041. In an alternative embodiment, the sync engine object may change the function parameters and resume the queued request instead of canceling and resubmitting the request.

In step 1047, the data object update for the data object modification detected in step 1037 is forwarded to the target system, wherein the target system is one of a mobile client device or a server. The forwarded request includes the LUID for the modified data object. In this step, the target system responds to the sync engine object with an acknowledgment indicating that the data object was updated. After the data object is updated on the target system, the sync engine object updates the corresponding LUID in the ID mapping table and control is passed to step 1049 where the method ends.

VII. Example Computer System Implementation

Figure 11:
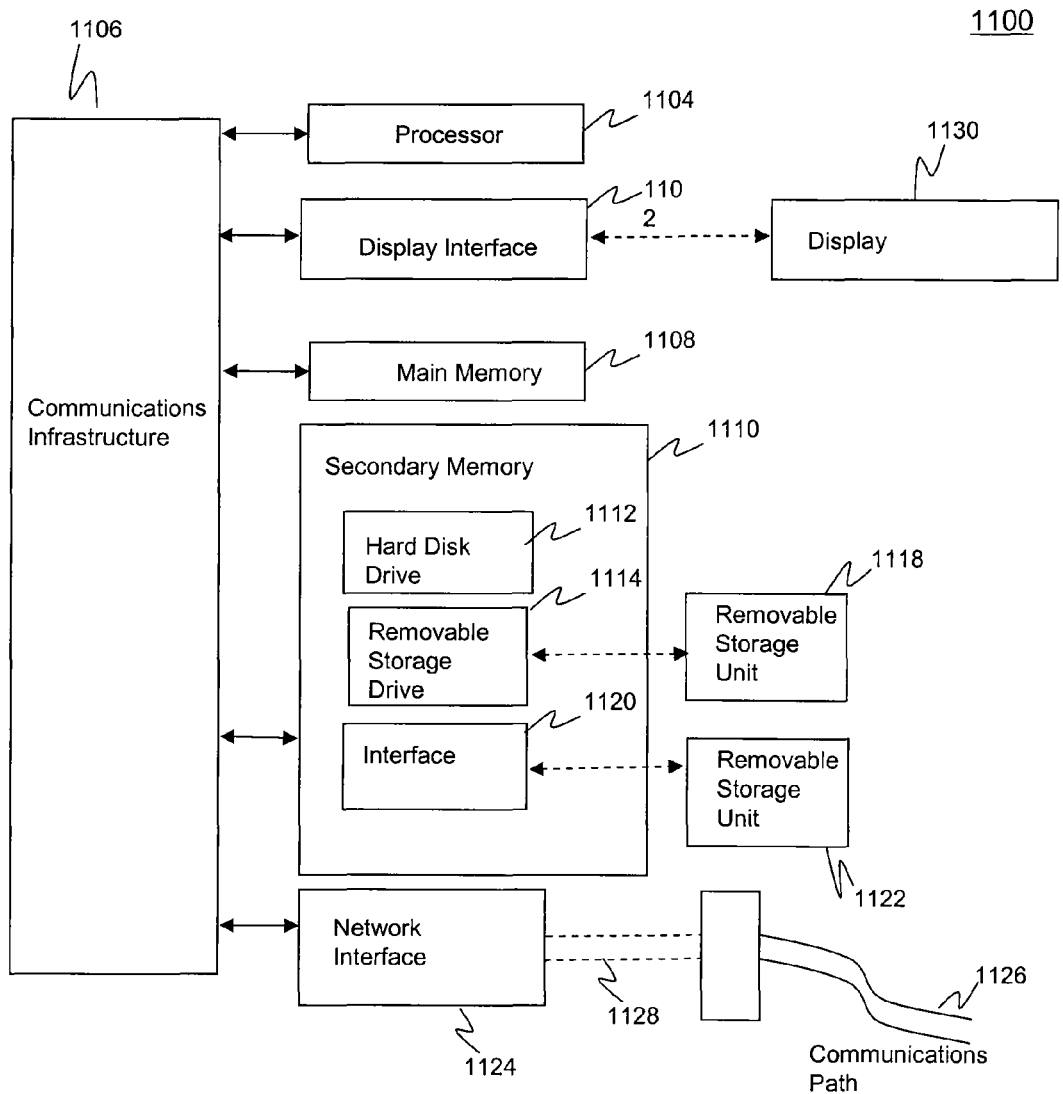
FIG. 11 depicts an example computer system in which the present invention may be implemented.

Various aspects of the present invention can be implemented by software, firmware, hardware, or a combination thereof. FIG. 11 illustrates an example computer system 1100 in which the present invention, or portions thereof, can be implemented as computer-readable code. For example, the methods illustrated by flowcharts FIGS. 5-8 can be implemented in system 1100. Various embodiments of the invention are described in terms of this example computer system 1100. After reading this description, it will become apparent to a person skilled in the relevant art how to implement the invention using other computer systems and/or computer architectures.

Computer system 1100 includes one or more processors, such as processor 1104. Processor 1104 can be a special purpose or a general purpose processor. Processor 1104 is connected to a communication infrastructure 1106 (for example, a bus, or network).

Computer system 1100 also includes a main memory 1108, preferably random access memory (RAM), and may also include a secondary memory 1110. Secondary memory 1110 may include, for example, a hard disk drive 1112, a removable storage drive 1114, flash memory, a memory stick, and/or any similar non-volatile storage mechanism. Removable storage drive 1114 may comprise a floppy disk drive, a magnetic tape drive, an optical disk drive, a flash memory, or the like. The removable storage drive 1114 reads from and/or writes to a removable storage unit 1118 in a well known manner. Removable storage unit 1118 may comprise a floppy disk, magnetic tape, optical disk, etc. which is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor 1104 to implement the processes of the present invention, such as the steps in the methods illustrated by flowcharts 700 of FIG. 7 and 800 of FIG. 8 discussed above. Accordingly, such computer programs represent controllers of the computer system 1100. Where the invention is implemented using software, the software may be stored in a computer program product and loaded into computer system 1100 using removable storage drive 1114, interface 1120, hard drive 1112, or communications interface 1124.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VIII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for synchronizing a data object between a mobile device and a server, the method comprising:
    (a) determining whether there is a data object to be synchronized from said mobile device to said server;
    (b) indicating to said server that there is a data object to be synchronized if it is determined in step (a) there is a data object to be synchronized from said mobile device;
    (c) saving the data object to be synchronized in a request cache, wherein said request cache is accessible from said server, and wherein the request cache includes at least a unique record identifier identifying the data object;
    (d) queuing the synchronization of said data object if it is determined that said mobile device is offline;
    (e) repeating step (d) until it is determined that said mobile device is online; and
    (f) receiving synchronization results at said mobile device after said data object has been synchronized on said server, wherein the synchronization results include at least a synchronization status and a unique record identifier identifying the data object.

2. The method of claim 1, wherein step (a) further comprises:
    determining whether the data object to be to be synchronized from said mobile device to said server is a new data object to be inserted into said server.

3. The method of claim 1, wherein step (a) further comprises:
    determining whether the data object to be to be synchronized from said mobile device to said server is an updated data object to be updated on said server.

4. The method of claim 1, wherein step (a) further comprises:
    determining whether the data object to be to be synchronized from said mobile device to said server is a deleted data object to be deleted from said server.

5. The method of claim 1, wherein step (a) further comprises:
    determining whether the data object to be to be synchronized from said mobile device to said server is a new data object to be inserted into said server.

6. The method of claim 1, wherein step (a) further comprises:
    determining whether there is a data object to be synchronized from said mobile device to said server with a listener running said mobile device.

7. The method of claim 1, wherein step (d) further comprises:
    determining whether said mobile device has network connectivity.

8. The method of claim 1, wherein step (f) further comprises:
    storing at least the unique record identifier in a database table accessible from said server.

9. The method of claim 1, wherein step (e) further comprises:
    repeating step (d) at a configurable interval.

10. The method of claim 9, wherein the configurable interval is based on factors, and wherein the factors include one or more of the number of synchronizations queued, the type of synchronizations queued, available memory on said mobile device, overall memory on said mobile device, the CPU speed of said mobile device, available CPU capacity on said mobile device, and the network bandwidth available to said mobile device.

11. The method of claim 9, wherein step (e) further comprises:
    the configurable interval is tunable on a synchronization server.

12. The method of claim 1, wherein step (e) further comprises:
    repeating step (d) based upon occurrence of one or more events.

13. The method of claim 1, wherein step (e) further comprises:
    repetition of step (d) is performed on an on-demand basis.

14. The method of claim 1, wherein step (f) further comprises:
    returning results including at least a unique record identifier identifying said synchronized data object and a timestamp indicating when the synchronization occurred on said server.

15. The method of claim 1, wherein the data object is one or more of an email message, a calendar entry, a data file, a method call, a web services request, and a database record.

16. The method of claim 1, wherein said mobile device is one or more of a personal digital assistants (PDAs), a device operating according to the Microsoft Pocket PC specification with the Microsoft Windows® CE operating system, a device running the Symbian operating system, a device running the Palm® operating system, a mobile phone, a BlackBerry® device, a smart phone, a hand held computer, a palmtop computer, a laptop computer, and an ultra-mobile PC.

17. The method of claim 1, wherein said server is one or more of an email server, a relational database server, a Microsoft Exchange server, a Lotus Domino server, a Lotus Notes server, and a Novell GroupWise server.

18. A method for synchronizing a data object between a server and a mobile device, the method comprising:
- (a) determining whether there is a data object to be synchronized from said server to said mobile device;
- (b) indicating to said mobile device that there is a data object to be synchronized if it is determined in step (a) there is a data object to be synchronized from said server;
- (c) saving information identifying the data object to be synchronized in a request cache, wherein said request cache is accessible from said mobile device, and wherein the request cache includes at least a unique record identifier identifying said data object;
- (d) queuing synchronization of said data object for said mobile device if it is determined that said mobile device is offline;
- (e) repeating step (d) until it is determined that said mobile device is online; and
- (f) receiving synchronization results at said server after said data object has been synchronized on said mobile device, wherein the synchronization results include at least a synchronization status and a unique record identifier identifying the data object.

19. A computer program product comprising a computer usable medium having computer program logic recorded thereon for enabling a processor to synchronize communications from a plurality of mobile devices to a plurality of servers, the computer program logic comprising:
- listening means for enabling a processor to determine whether there is a data object to be synchronized from one of the plurality of mobile devices to one of the plurality of servers;
- flagging means for enabling a processor to indicate to said one of the plurality of servers that there is a data object to be synchronized if the listening means determines that there is a data object to be synchronized from said one of the plurality of mobile devices;
- caching means for enabling a processor to save the data object to be synchronized in a request cache, wherein the request cache is accessible from said one of the plurality of servers, wherein the request cache includes at least a unique record identifier identifying said data object;
- determining means for enabling a processor to determine whether said one of the plurality of mobile devices is offline;
- queuing means for enabling a processor to queue the synchronization of said data object for said one of the plurality of servers if the determining means determines that said one of the plurality of mobile devices is offline; and
- receiving means for enabling a processor to receive synchronization results at said one of the plurality of mobile devices after said data object has been synchronized on said one of the plurality of servers, wherein the synchronization results include at least a synchronization status and a unique record identifier identifying the data object.

20. A computer program product comprising a computer usable medium having computer program logic recorded thereon for enabling a processor to synchronize communications from a plurality of servers to a plurality of mobile devices, the computer program logic comprising:
- listening means for enabling a processor to determine whether there is a data object to be synchronized from one of the plurality of servers to one of the plurality of mobile devices;
- flagging means for enabling a processor to indicate to said one of the plurality of mobile devices that there is a data object to be synchronized if the listening means determines that there is a data object to be synchronized from said one of the plurality of servers;
- caching means for enabling a processor to save the data object to be synchronized in a request cache, wherein the request cache is accessible from said one of the plurality of mobile devices, and wherein the request cache includes at least a unique record identifier identifying said data object;
- determining means for enabling a processor to determine whether said one of the plurality of mobile devices is offline;
- queuing means for enabling a processor to queue the synchronization of said data object for said one of the plurality of mobile devices if the determining means determines that said one of the plurality of mobile devices is offline; and
- receiving means for enabling a processor to receive synchronization results at said one of the plurality of servers after said data object has been synchronized on said one of the plurality of mobile devices, wherein the synchronization results include at least a synchronization status and a unique record identifier identifying the data object.

21. A system capable of synchronizing data objects between a mobile device and a server, the system comprising:
- a listening module configured to determine whether there is a data object to be synchronized from said mobile device to said server;
- a flagging module configured to indicate to said server that there is a data object to be synchronized if the listening module determines that there is a data object to be synchronized from said mobile device;
- a caching module configured to save the data object to be synchronized in a request cache on said server, wherein the request cache includes at least a unique record identifier identifying said data object;
- a determining module configured to determine whether said mobile device is offline;
- a queuing module configured to queue the synchronization of said data object for said server if the determining module determines that said one of the plurality of mobile devices is offline; and
- a receiving module configured to receive synchronization results at said mobile device after said data object has been synchronized on said server, wherein the synchronization results include at least a synchronization status and a unique record identifier identifying the data object.

22. A system capable of synchronizing data objects between a server and a mobile device, the system comprising:
- a listening module configured to determine whether there is a data object to be synchronized from said server to said mobile device;
- a flagging module configured to indicate to said server that there is a data object to be synchronized if the listening module determines that there is a data object to be synchronized from said mobile device;
- a caching module configured to save the data object to be synchronized in a request cache on said server, wherein the request cache includes at least a unique record identifier identifying said data object;
- a determining module configured to determine whether said mobile device is offline;
- a queuing module configured to queue the synchronization of said data object for said server if the determining module determines that said one of the plurality of mobile devices is offline; and a receiving module configured to receive synchronization results at said server after said data object has been synchronized on said mobile device, wherein the synchronization results include at least a synchronization status and a unique record identifier identifying the data object.

* * * * *